US012693498B2

(12) United States Patent
Zhao et al.

(10) Patent No.: US 12,693,498 B2
(45) Date of Patent: Jul. 28, 2026

(54) CAMERA OPTICAL LENS

(71) Applicant: Changzhou AAC Raytech Optronics Co., Ltd., Changzhou City (CN)

(72) Inventors: Shijia Zhao, Changzhou (CN); Zhen Huang, Changzhou (CN); Lu Pan, Changzhou (CN); Shunda Zhou, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 229 days.

(21) Appl. No.: 18/770,697

(22) Filed: Jul. 12, 2024

(65) Prior Publication Data

US 2025/0327993 A1 Oct. 23, 2025

(30) Foreign Application Priority Data

Apr. 19, 2024 (CN) .......................... 202410480520.0

(51) Int. Cl.
 *G02B 9/64* (2006.01)
 *G02B 13/00* (2006.01)
(52) U.S. Cl.
 CPC ........... *G02B 9/64* (2013.01); *G02B 13/0045* (2013.01)
(58) Field of Classification Search
 USPC ........................................................ 359/755
 See application file for complete search history.

(56) References Cited

U.S. PATENT DOCUMENTS

| | | | |
|---|---|---|---|
| 2021/0173180 A1* | 6/2021 | Sun ..................... | G02B 13/0045 |
| 2022/0050366 A1* | 2/2022 | Huang ................. | G03B 21/008 |
| 2022/0082793 A1* | 3/2022 | Luan .................. | G02B 13/0045 |
| 2022/0113517 A1* | 4/2022 | Zhang ................ | G02B 13/0045 |
| 2023/0204932 A1* | 6/2023 | He .......................... | G02B 13/18 |
| | | | 359/676 |
| 2023/0341660 A1* | 10/2023 | Liang ....................... | G02B 9/64 |

FOREIGN PATENT DOCUMENTS

CN 111198430 A * 5/2020 ............. G02B 13/06

* cited by examiner

*Primary Examiner* — Darryl J Collins
(74) *Attorney, Agent, or Firm* — Wiersch Law Group

(57) ABSTRACT

The present disclosure relates to the field of optical lens, and discloses a camera optical lens, including from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power; and the following relational expressions are satisfied: $-0.300 \leq \mathrm{Sin}(A1.0out14)*R14/f7 \leq 0.003$; $1.05 \leq (f1+f2+f3+f4)/(f5+f6+f7) \leq 2.30$; $-1.40 \leq \mathrm{Sin}(A0.8out8)*R8/f4 \leq 0.10$. The camera optical lens according to the present disclosure has excellent optical characteristics of sufficient aberration correction, large aperture, wide-angle, ultra-thin, diversified structural design, and high sensor matching, and is particularly suitable for a mobile phone camera lens assembly and a WEB camera lens which are composed of camera elements such as CCD, CMOS with high definition and a vehicle-mounted lens.

19 Claims, 9 Drawing Sheets longitudinal aberration lateral color

20 longitudinal aberration millimeter lateral color micrometer longitudinal aberration millimeter lateral color micrometer

CAMERA OPTICAL LENS

TECHNICAL FIELD

The present disclosure relates to the field of optical lens and, in particular, to a camera optical lens applicable to handheld terminal devices such as smart phones, digital cameras, and camera devices such as monitors and PC lenses, vehicle-mounted lenses.

BACKGROUND

In recent years, with the rise of various smart devices, the demand for a miniaturized camera optical lens has gradually increased, and since the pixel size of the optical sensor is reduced, and the current electronic product has a development trend of light weight, thin and portable, the miniaturized camera optical lens with good imaging quality has become the mainstream of the current market. In order to obtain better imaging quality, a multi-lens structure is mostly used. In addition, with the development of technology and the increase of diversified requirements of users, under the condition that the pixel area of the optical sensor is continuously reduced and the requirements on the imaging quality of the system are continuously improved, the structure with seven lenses gradually appears in the lens design. There is an urgent need for a wide-angle camera lens having excellent optical characteristics such as large aperture, wide-angle, ultra-thin and sufficiently corrected aberration.

SUMMARY

In view of the above problems, an object of the present disclosure is to provide a camera optical lens, which has good optical performance and meets design requirements of sufficient aberration correction, large aperture, wide-angle, ultra-thin, diversified structural design and high sensor matching.

In order to achieve the above object, the technical solution of the present disclosure provides a camera optical lens sequentially includes seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object side surface of the first lens is convex in the paraxial region, and an image side surface of the first lens is concave in the paraxial region; an object side surface of the second lens is convex in the paraxial region, and an image side surface of the second lens is concave in the paraxial region; an object side surface of the third lens is concave in the paraxial region, and an image side surface of the third lens is concave in the paraxial region; an object side surface of the fourth lens is convex in the paraxial region, and an image side surface of the fourth lens is convex in the paraxial region; an object side surface of the fifth lens is convex in the paraxial region, and an image side surface of the fifth lens is concave in the paraxial region; an object side surface of the sixth lens is convex in the paraxial region, and an image side surface of the sixth lens is convex in the paraxial region; an object side surface of the seventh lens is convex in the paraxial region, and an image side surface of the seventh lens is concave in the paraxial region;

wherein a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, a central curvature radius of the image side surface of the fourth lens in the paraxial region is R8, a central curvature radius of the object side surface of the fifth lens in the paraxial region is R9, a central curvature radius of the image side surface of the fifth lens in the paraxial region is R10, a central curvature radius of the image side surface of the seventh lens in the paraxial region is R14, the entrance pupil diameter of the camera optical lens is ENPD, the field of view of the 1.0 field of view of the camera optical lens is FOV, an on-axis distance from the image side of the first lens to the object side of the second lens is d2, an on-axis distance from the image side of the second lens to the object side of the third lens is d4, the angle between the chief ray of the 1.0 field of view of the camera optical lens and the optical axis when it is emitted from the image side of the seventh lens is $\mathrm{Sin}(A1.0out14)$, the angle between the chief ray of the 0.8 field of view of the camera optical lens and the optical axis when it is emitted from the image side of the fourth lens is $\mathrm{Sin}(A0.8out8)$, and the following relational expressions are satisfied:

$$-1.40 \le f3/f4 \le -0.60;$$

$$1.20 \le R9/R10 \le 190;$$

$$5.10 \le ENPD/\mathrm{Tan}(FOV/2) \le 5.70;$$

$$0.30 \le d2/d4 \le 0.60;$$

$$-0.300 \le \mathrm{Sin}(A1.0out14)*R14/f7 \le 0.003;$$

$$1.05 \le (f1+f2+f3+f4)/(f5+f6+f7) \le 2.30;$$

$$-1.40 \le \mathrm{Sin}(A0.8out8)*R8/f4 \le 0.10.$$

As an improvement, the following relational expression is satisfied:

$$0.30 \le d2/d4 \le 0.50.$$

As an improvement, the following relational expression is satisfied:

$$0.230 \le \mathrm{Sin}(A1.0out14)*R14/f7 \le 0.003.$$

As an improvement, the following relational expression is satisfied:

$$1.25 \le (f1+f2+f3+f4)/(f5+f6+f7) \le 2.00.$$

As an improvement, the following relational expression is satisfied:

$$1.20 \le \mathrm{Sin}(A0.8out8)*R8/f4 \le 0.10.$$

As an improvement, an on-axis thickness of the sixth lens is d11, a following relational expression is satisfied:

$$9.00 \leq f6/d11 \leq 16.00.$$

As an improvement, the following relational expression is satisfied:

$$11.00 \leq f6/d11 \leq 14.00.$$

As an improvement, the first lens is made of glass.

The technical solution of the present disclosure further provides a camera optical lens, the camera optical lens sequentially includes seven lenses, and the seven lenses from an object side to an image side are: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

an object side surface of the first lens is convex in the paraxial region, and an image side surface of the first lens is concave in the paraxial region; an object side surface of the second lens is convex in the paraxial region, and an image side surface of the second lens is concave in the paraxial region; an object side surface of the third lens is concave in the paraxial region, and an image side surface of the third lens is concave in the paraxial region; an object side surface of the fourth lens is convex in the paraxial region, and an image side surface of the fourth lens is convex in the paraxial region; an object side surface of the fifth lens is convex in the paraxial region, and an image side surface of the fifth lens is concave in the paraxial region; an object side surface of the sixth lens is convex in the paraxial region, and an image side surface of the sixth lens is convex in the paraxial region; an object side surface of the seventh lens is convex in the paraxial region, and an image side surface of the seventh lens is concave in the paraxial region;

wherein a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, a central curvature radius of the object side surface of the first lens in the paraxial region is R1, a central curvature radius of the image side surface of the second lens in the paraxial region is R4, a central curvature radius of the object side surface of the third lens in the paraxial region is R5, a central curvature radius of the image side surface of the fourth lens in the paraxial region is R8, a central curvature radius of the image side surface of the seventh lens in the paraxial region is R14, the angle between the chief ray of the 1.0 field of view of the camera optical lens and the optical axis when it is emitted from the image side of the seventh lens is Sin(A1.0out14), the angle between the chief ray of the 0.8 field of view of the camera optical lens and the optical axis when it is emitted from the image side of the fourth lens is Sin(A0.8out8), the maximum incident angle of all the main lights of the camera optical lens on the image plane is CRAmax, and the following relational expressions are satisfied:

$$-0.300 \leq \mathrm{Sin}(A1.0out14) * R14/f7 \leq 0.003;$$
$$1.05 \leq (f1 + f2 + f3 + f4)/(f5 + f6 + f7) \leq 2.30;$$
$$-1.40 \leq \mathrm{Sin}(A0.8out8) * R8/f4 \leq 0.10;$$
$$1.60 \leq f1/R1 + f4/R8 \leq 3.00;$$
$$-14.00 \leq f2/R4 + f3/R5 \leq -5.50; \text{ and}$$
$$35.00° \leq CRA\text{max} \leq 40.00°.$$

As an improvement, the following relational expression is satisfied:

$$1.95 \leq f1/R1 + f4/R8 \leq 2.55.$$

As an improvement, the following relational expression is satisfied:

$$12.00 \leq f2/R4 + f3/R5 \leq -7.00.$$

As an improvement, the following relational expression is satisfied:

$$0.230 \leq \mathrm{Sin}(A1.0out14) * R14/f7 \leq 0.003.$$

As an improvement, the following relational expression is satisfied:

$$1.25 \leq (f1 + f2 + f3 + f4)/(f5 + f6 + f7) \leq 2.00.$$

As an improvement, the following relational expression is satisfied:

$$1.20 \leq \mathrm{Sin}(A0.8out8) * R8/f4 \leq 0.10.$$

As an improvement, an on-axis thickness of the seventh lens is d13, and satisfies the following relational expression: $-15.00 \leq f7/d13 \leq -8.50$.

As an improvement, the following relational expression is satisfied:

$$12.00 \leq f7/d13 \leq -10.00.$$

As an improvement, the following relational expression is satisfied: $-4.80 \leq f7/R14 \leq -1.60$.

As an improvement, the following relational expression is satisfied: $-4.00 \leq f7/R14 \leq -2.00$.

As an improvement, the first lens is made of glass.

The present disclosure has the following beneficial effects: The camera optical lens according to the present disclosure has excellent optical characteristics of sufficient aberration correction, large aperture, wide-angle, ultra-thin, diversified structural design, and high sensor matching, and is particularly suitable for a mobile phone camera lens assembly and a WEB camera lens which are composed of camera elements such as CCD, CMOS with high definition and a vehicle-mounted lens.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

Figure 1:
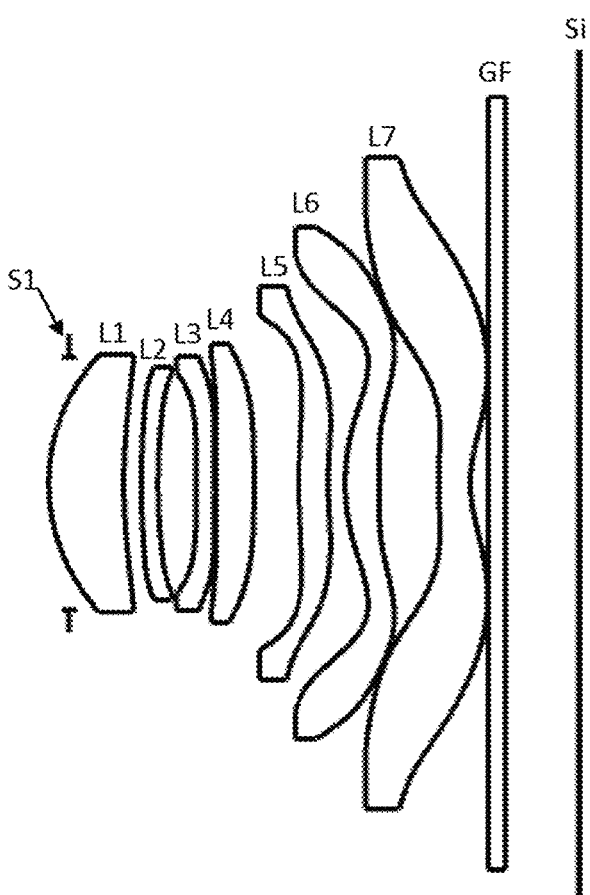
FIG. 1 is a structural schematic diagram of a camera optical lens according to Embodiment 1 of the present disclosure.

In order to more clearly illustrate objectives, technical solutions, and advantages of the embodiments of the present disclosure, the technical solutions in the embodiments of the present disclosure are clearly and completely described in details with reference to the drawings. However, those of ordinary skill in the art will appreciate that in various embodiments of the present disclosure, numerous technical details are set forth for the reader to better understand the present disclosure. However, even without these technical details and various variations and modifications based on the following embodiments, the technical solutions claimed in the present disclosure can still be implemented.

Referring to FIGS. 1-16, the technical solution of the present disclosure provides camera optical lenses 10, 20, 30 and 40. FIG. 1, FIG. 5, FIG. 9, and FIG. 13 show camera optical lenses 10, 20, 30, and 40 according to the present disclosure, and the camera optical lenses 10, 20, 30, and 40 include seven lenses. The camera optical lens sequentially includes from an object side to an image side: an aperture; a first lens L1, a second lens L2, a third lens L3, a fourth lens L4, a fifth lens L5, a sixth lens L6 and a seventh lens L7. An optical element such as a grating filter GF may be provided between the seventh lens L7 and an image side surface Si.

The first lens L1 is made of glass material, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. The glass and the resin lens are matched to reduce chromatic aberration and improve the performance of the optical camera lens. The lenses may also be made of other materials.

The object surfaces and the image surfaces of the first lens L1, the second lens L2, the third lens L3, the fourth lens L4, the fifth lens L5, the sixth lens L6, and the seventh lens L7 are aspheric surfaces.

An object side surface of the first lens L1 is convex in a paraxial region, an image side surface of the first lens L1 is concave in the paraxial region, and the first lens L1 has positive refractive power. The object side surface and the image side surface of the first lens L1 may also be provided with other concave and convex distributions.

An object side surface of the second lens L2 is convex in the paraxial region, an image side surface of the second lens L2 is concave in the paraxial region, and the second lens L2 has negative refractive power. The object side surface and the image side surface of the second lens L2 may also be provided with other concave and convex distributions.

An object side surface of the third lens L3 is concave in a paraxial region, an image side surface of the third lens L3 is concave in the paraxial region, and the third lens L3 has negative refractive power. The object side surface and the image side surface of the third lens L3 may also be provided with other concave and convex distributions.

An object side surface of the fourth lens L4 is convex in the paraxial region, an image side surface of the fourth lens L4 is convex in the paraxial region, and the fourth lens L4 has positive refractive power. The object side surface and the image side surface of the fourth lens L4 may also be provided with other concave and convex distributions.

An object side surface of the fifth lens L5 is convex in a paraxial region, an image side surface of the fifth lens L5 is concave in the paraxial region, and the fifth lens L5 has negative refractive power. The object side surface and the image side surface of the fifth lens L5 may also be provided with other concave and convex distributions.

An object side surface of the sixth lens L6 is convex in a paraxial region, an image side surface of the sixth lens L6 is convex in the paraxial region, and the sixth lens L6 has positive refractive power. The object side surface and the image side surface of the sixth lens L6 may also be provided with other concave and convex distributions.

An object side surface of the seventh lens L7 is convex in a paraxial region, an image side surface of the seventh lens L7 is concave in the paraxial region, and the seventh lens L7 has negative refractive power. The object side surface and the image side surface of the seventh lens L7 may also be provided with other concave and convex distributions.

A focal length of the third lens L3 is defined as f3, a focal length of the fourth lens L4 is defined as f4, and the following relational expression is satisfied: −1.40≤f3/f4≤−0.60, within the range of the relational expression, it may avoid the excessive deflection of the light when passing through the system and reduce the difficulty of aberration correction, better correct the field curvature and distortion of the lens, ensure that the field curvature and distortion of the lens are controlled at a smaller level, and realize the high definition imaging of the system by reasonably allocating the ratios of the focal length of the third lens and the fourth lens.

A central curvature radius of the object side surface of the fifth lens L5 in the paraxial region is defined as R9, a central curvature radius of the image side surface of the fifth lens L5 in the paraxial region is defined as R10, and the following relational expression is satisfied: 1.20≤R9/R10≤1.90, within the range of the relational expression, the fifth lens may have a smaller refractive power, and the combination with the fourth lens may better correct the chromatic aberration of the system and improve the overall imaging quality.

The entrance pupil diameter of the camera optical lens is defined as ENPD, and the field of view of a 1.0 field of view of the camera optical lens is defined as FOV, and the following relational expression is satisfied: 5.10≤ENPD/Tan (FOV/2)≤5.70, it may realize a small FNO lens, increase the light intake and meet the needs of wide-angle by limiting the entrance pupil diameter and the field of view within a reasonable range.

An on-axis distance between the image side surface of the first lens L1 and the object side surface of the second lens L2 is defined as d2, an on-axis distance between the image side surface of the second lens L2 and the object side surface of the third lens L3 is defined as d4, and the following relational expression is satisfied: 0.30≤d2/d4≤0.60, the air gap between the first lens and the third lens is reasonably configured, so that the peripheral structure of the lens, especially the thickness of the peripheral portion of the lens, may be reasonably designed, and the design of the connection structure between the lenses is more diversified. Optionally, 0.30≤d2/d4≤0.50.

The angle between the chief ray of the 1.0 field of view of the camera optical lens and the optical axis when it is emitted from the image side of the seventh lens is defined as Sin(A1.0out14), a focal length of the seventh lens L7 is defined as f7, a central curvature radius of the image side surface of the seventh lens L7 in the paraxial region is defined as R14, and the following relational expression is satisfied: −0.300≤Sin(A1.0out14)*R14/f7≤0.003, it is beneficial to increase the image height to match the large image height sensor, and to better match the chief ray angle of the imaging sensor in the 1.0 field of view, so as to obtain a better image by controlling the relationship between the angle between the chief ray of the 1.0 field of view and the optical axis when it is emitted from the image side of the seventh lens and the radius of curvature of the image side center of the seventh lens and the focal length of the seventh lens Optionally, −0.230≤Sin(A1.0out14)*R14/f7≤0.003.

A focal length of the first lens L1 is defined as f1, a focal length of the second lens L2 is defined as f2, a focal length of the third lens L3 is defined as f3, a focal length of the fourth lens L4 is defined as f4, a focal length of the fifth lens L5 is defined as f5, a focal length of the sixth lens L6 is defined as f6, a focal length of the seventh lens L7 is defined as f7, and the following relational expression is satisfied: 1.05≤(f1+f2+f3+f4)/(f5+f6+f7)≤2.30, it is beneficial to realize wide-angle and ultra-thin effects and better correct the aberration of the last three lenses by reasonably controlling the refractive power of each lens. Optionally, 1.25≤(f1+f2+f3+f4)/(f5+f6+f7)≤2.00.

The angle between the chief ray of the 0.8 field of view of the camera optical lens and the optical axis when it is emitted from the image side of the fourth lens L4 is Sin(A0.8out8), a central curvature radius of the image side surface of the fourth lens L4 in the paraxial region is defined as R8, a focal length of the fourth lens L4 is defined as f4, and the following relational expression is satisfied: −1.40≤Sin(A0.8out8)*R8/f4≤0.10. By controlling the relationship among the angle between chief ray in the 0.8 field of view when exiting from the image side surface of the fourth lens with the optical axis, the central curvature radius of the image side surface of the fourth lens and the focal length of the fourth lens, it is beneficial to better match the chief ray angle of the imaging sensor in the 0.8 field of view and obtain better images, in addition, it is beneficial to the camera optical lens to better adjust the focus position of the light, improve the aggregation ability of the camera optical lens to the light, and effectively balance the on-axis aberration of the camera optical lens. Optionally, −1.20≤Sin (A0.8out8)*R8/f4≤0.10.

An on-axis thickness of the sixth lens L6 is defined as d11, and the following relational expression is satisfied: 9.00≤f6/d11≤16.00, it is beneficial to correct the aberration and improve the processability of the sixth lens by reasonably controlling the ratio of the focal length of the sixth lens to the on-axis thickness. Optionally, 11.00≤f6/d11≤14.00.

A central curvature radius of the object side surface of the first lens L1 in the paraxial region is defined as R1, and the following relational expression is satisfied: 1.60≤f1/R1+f4/R8≤3.00, within the range of the relational expression, it is beneficial to reduce the assembly sensitivity of the first four lenses, improve the assembly yield, and reduce the aberration. Optionally, 1.95≤f1/R1+f4/R8≤2.55.

An central curvature radius of the image side surface of the second lens L2 in the paraxial region is defined as R4, an central curvature radius of the object side surface of the third lens L3 in the paraxial region is defined as R5, and the following relational expression is satisfied: −14.00≤f2/R4+f3/R5≤−5.50, within the range of the relational expression, it is beneficial for the camera optical lens to better adjust the light focusing position, improve the aggregation ability of the camera optical lens to light, and effectively balance the on-axis aberration of the camera optical lens. Optionally, −12.00≤f2/R4+f3/R5≤−7.00.

The maximum incident angle of all the main lights of the camera optical lens on the image plane is defined as CRAmax, and the following relational expression is satisfied: 35.00°≤CRAmax≤40.00°, within the range of the relational expression, the maximum incident angle of the chief ray is controlled to match the imaging sensor, thereby obtaining higher image quality.

An on-axis thickness of the seventh lens L7 is defined as d13, and satisfies the following relational expression: −15.00≤f7/d13≤−8.50, within the range of the relational expression, it is beneficial to adjust the shape and processability of the seventh lens to improve the production yield. Optionally, −12.00≤f7/d13≤−10.00.

A focal length of the seventh lens L7 is f7, a central curvature radius of the image side surface of the seventh lens L7 in the paraxial region is R14, and the following relational expression is satisfied: −4.80≤f7/R14≤−1.60, within the range of the relational expression, it is beneficial to adjust the shape and refractive power of the seventh lens to correct the aberration. Optionally, −4.00≤f7/R14≤−2.00.

Compared with the prior art, the camera optical lens provided by the present disclosure is configured with $-1.40 \leq f3/f4 \leq -0.60$; $1.20 \leq R9/R10 \leq 1.90$; $5.10 \leq ENPD/Tan(FOV/2) \leq 5.70$; $0.30 \leq d2/d4 \leq 0.60$; $-0.300 \leq Sin(A1.0out14)*R14/f7 \leq 0.003$; $1.05 \leq (f1+f2+f3+f4)/(f5+f6+f7) \leq 2.30$; $-1.40 \leq Sin(A0.8out8)*R8/f4 \leq 0.10$, which control the degree of optical deflection, reduce the difficulty of aberration correction, ensure that the field curvature and distortion of the lens are controlled at a small level, and achieve high definition imaging of the system; in addition, the fifth lens has a smaller refractive power, which may be better combined with the fourth lens to correct the chromatic aberration of the system, improve the overall imaging quality, realize the lens with small FNO and large aperture, increase the light intake and meet the needs of wide-angle; the design of the connection structure between the lenses is more diversified by reasonably designing the peripheral structure of the lens, especially the thickness of the peripheral portion of the lens; In addition, while increasing the image height to match the large image height sensor, it is also beneficial to better match the chief ray angle of the imaging sensor in the 1.0 field of view and the 0.8 field of view, so as to obtain a better image; it is beneficial to achieve the wide-angle and ultra-thin effects by reasonably controlling the refractive power of each lens, the last three lenses may better correct the aberration, which is beneficial to the camera optical lens to better adjust the light focusing position, improve the aggregation ability of the camera optical lens to the light, and effectively balance the on-axis aberration of the camera optical lens.

In addition, compared with the prior art, the present disclosure may also be configured with $-0.300 \leq Sin(A1.0out14)*R14/f7 \leq 0.003$, $1.05 \leq (f1+f2+f3+f4)/(f5+f6+f7) \leq 2.30$, $-1.40 \leq Sin(A0.8out8)*R8/f4 \leq 0.10$, $1.60 \leq f1/R1+f4/R8 \leq 3.00$, $-14.00 \leq f2/R4+f3/R5 \leq -5.50$, $35.00° \leq CRAmax \leq 40.00°$, it is beneficial to increase the image height matching large image height sensor and it may better match the chief ray angle of the imaging sensor in the 1.0 field of view and the 0.8 field of view, and obtain better images; it is beneficial to achieve the effect of wide-angle and ultra-thin and the last three lenses may also better correct the aberration, so that the camera optical lens may better adjust the focus position of the light, improve the aggregation ability of the camera optical lens to the light, and effectively balance the axial aberration of the camera optical lens by reasonably controlling the refractive power of each lens; In addition, it is also beneficial to reduce the assembly sensitivity of the first four lenses and improve the assembly yield.

The camera optical lens of the present disclosure will be described below with examples. The reference signs recited in each example are shown below. The units of focal length, on-axis distance, central curvature radius and on-axis thickness are millimeter (mm).

TTL: total optical length from the object side surface of the first lens to an image plane of the camera optical lens along an optic axis (the on-axis distance from the object-side surface of the first lens L1 to the image plane Si), in mm.

F-number FNO: refers to the ratio of the effective focal length of the camera optical lens to the entrance pupil diameter of the camera optical lens.

The technical solutions of the present disclosure will be described in detail in four embodiments.

Embodiment 1

Table 1 and Table 2 show design data of the camera optical lens 10 according to Embodiment 1 of the present disclosure.

TABLE 1

| | R | | d | | nd | | vd |
|---|---|---|---|---|---|---|---|
| S1 | ∞ | d0= | −0.387 | | | | |
| R1 | 3.537 | d1= | 1.425 | nd1 | 1.4959 | v1 | 81.65 |
| R2 | 10.586 | d2= | 0.332 | | | | |
| R3 | 12.877 | d3= | 0.317 | nd2 | 1.6700 | v2 | 19.39 |
| R4 | 10.525 | d4= | 0.728 | | | | |
| R5 | −56.663 | d5= | 0.333 | nd3 | 1.6700 | v3 | 19.39 |
| R6 | 52.463 | d6= | 0.035 | | | | |
| R7 | 37.540 | d7= | 0.727 | nd4 | 1.5444 | v4 | 55.82 |
| R8 | −52.061 | d8= | 0.856 | | | | |
| R9 | 10.462 | d9= | 0.563 | nd5 | 1.5661 | v5 | 37.71 |
| R10 | 7.017 | d10= | 0.325 | | | | |
| R11 | 4.543 | d11= | 0.643 | nd6 | 1.5444 | v6 | 55.82 |
| R12 | −32.985 | d12= | 1.129 | | | | |
| R13 | 7.870 | d13= | 0.601 | nd7 | 1.5346 | v7 | 55.69 |
| R14 | 2.418 | d14= | 0.350 | | | | |
| R15 | ∞ | d15= | 0.310 | ndg | 1.5168 | vg | 64.17 |
| R16 | ∞ | d16= | 1.407 | | | | |

The meaning of each reference sign is as follows.

S1: aperture;

R: curvature radius at the center of the optical surface;

R1: central curvature radius of the object side surface of the first lens L1 in the paraxial region;

R2: central curvature radius of the image side surface of the first lens L1 in the paraxial region;

R3: central curvature radius of the object side surface of the second lens L2 in the paraxial region;

R4: central curvature radius of the image side surface of the second lens L2 in the paraxial region;

R5: central curvature radius of the object side surface of the third lens L3 in the paraxial region;

R6: central curvature radius of the image side surface of the third lens L3 in the paraxial region;

R7: central curvature radius of the object side surface of the fourth lens L4 in the paraxial region;

R8: central curvature radius of the image side surface of the fourth lens L4 in the paraxial region;

R9: central curvature radius of the object side surface of the fifth lens L5 in the paraxial region;

R10: central curvature radius of the image side surface of the fifth lens L5 in the paraxial region;

R11: central curvature radius of the object side surface of the sixth lens L6 in the paraxial region;

R12: central curvature radius of the image side surface of the sixth lens L6 in the paraxial region;

R13: central curvature radius of the object side surface of the seventh lens L7 in the paraxial region;

R14: central curvature radius of the image side surface of the seventh lens L7 in the paraxial region;

R15: central curvature radius of the object side surface of the grating filter GF in the paraxial region;

R16: central curvature radius of the image side surface of the grating filter GF in the paraxial region;

d: on-axis thickness of lenses, on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the seventh lens L7;

d13: on-axis thickness of the seventh lens L7;

d14: on-axis distance from the image side surface of the seventh lens L7 to the object side surface of the grating filter GF;

d15: on-axis thickness of the grating filter GF;

d16: on-axis distance from the image side surface of the grating filter GF to the image plane Si;

nd: refractive index of d line (the d line is green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

ndg: refractive index of d line of the grating filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the grating filter GF.

Table 2 shows aspheric surface data of each lens in the camera optical lens 10 according to Embodiment 1 of the present disclosure.

TABLE 2

| | Conic Coefficient | Aspheric Coefficient | | | | |
|---|---|---|---|---|---|---|
| | k | A4 | A6 | A8 | A10 | A12 |
| R1 | 7.3239E−03 | −1.2808E−03 | 3.6930E−03 | −4.5818E−03 | 3.0114E−03 | −1.1707E−03 |
| R2 | −4.6554E−01 | −1.9779E−03 | −2.4141E−03 | 3.6313E−03 | −2.9630E−03 | 1.4107E−03 |
| R3 | −5.7425E−01 | −6.1169E−03 | 1.9676E−03 | −1.8357E−03 | 1.6944E−03 | −8.3504E−04 |
| R4 | 7.6343E−01 | −4.3008E−03 | 2.7870E−03 | −3.7700E−03 | 3.8936E−03 | −2.2975E−03 |
| R5 | −1.8171E+02 | −5.7706E−03 | −4.7880E−03 | 2.0590E−03 | −1.4564E−03 | 7.0240E−04 |
| R6 | 2.6957E+01 | 4.5290E−03 | −1.3319E−02 | 6.5639E−03 | −2.4505E−03 | 6.8011E−04 |
| R7 | 2.3348E+01 | 1.4308E−03 | −8.5216E−03 | 2.5823E−03 | 4.0793E−04 | −4.5789E−04 |
| R8 | −1.1911E+02 | −1.1393E−02 | 1.9726E−03 | −1.7526E−03 | 9.0310E−04 | −2.7234E−04 |
| R9 | −2.0270E+00 | −1.6937E−02 | 1.3327E−03 | 3.0334E−03 | −2.2593E−03 | 7.3333E−04 |
| R10 | −1.1829E+00 | −1.9498E−02 | −1.6145E−02 | 1.5110E−02 | −7.3072E−03 | 2.4200E−03 |
| R11 | −9.9447E−01 | 3.0842E−02 | −2.2883E−02 | 9.6637E−03 | −3.3611E−03 | 8.6953E−04 |
| R12 | −4.4958E+00 | 4.6037E−02 | −7.0252E−03 | −2.1886E−03 | 1.1686E−03 | −2.6470E−04 |
| R13 | −1.2342E+00 | −4.8960E−02 | 7.7141E−03 | −1.1389E−03 | 1.4717E−04 | −1.2012E−05 |
| R14 | −9.9858E−01 | −6.4095E−02 | 1.4618E−02 | −2.9548E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | 7.3239E−03 | 2.7749E−04 | −3.9471E−05 | 3.0979E−06 | −1.0330E−07 | 0.0000E+00 |
| R2 | −4.6554E−01 | −4.0406E−04 | 6.8900E−05 | −6.4529E−06 | 2.5512E−07 | 0.0000E+00 |
| R3 | −5.7425E−01 | 2.5050E−04 | −4.4798E−05 | 4.4039E−06 | −1.8348E−07 | 0.0000E+00 |
| R4 | 7.6343E−01 | 8.3099E−04 | −1.8011E−04 | 2.1484E−05 | −1.0801E−06 | 0.0000E+00 |
| R5 | −1.8171E+02 | −2.1551E−04 | 3.9835E−05 | −3.8828E−06 | 1.4887E−07 | 0.0000E+00 |
| R6 | 2.6957E+01 | −1.2827E−04 | 1.4104E−05 | −6.4407E−07 | −2.0983E−09 | 0.0000E+00 |
| R7 | 2.3348E+01 | 1.3574E−04 | −2.1442E−05 | 1.8368E−06 | −6.6553E−08 | 0.0000E+00 |
| R8 | −1.1911E+02 | 5.1649E−05 | −5.9495E−06 | 3.5825E−07 | −7.5898E−09 | 0.0000E+00 |
| R9 | −2.0270E+00 | −7.9484E−05 | −3.0151E−05 | 1.5568E−05 | −3.5220E−06 | 4.8629E−07 |
| R10 | −1.1829E+00 | −5.8265E−04 | 1.0333E−04 | −1.3514E−05 | 1.2972E−06 | −9.0101E−08 |
| R11 | −9.9447E−01 | −1.6116E−04 | 2.1309E−05 | −2.0235E−06 | 1.3871E−07 | −6.8321E−09 |
| R12 | −4.4958E+00 | 3.7888E−05 | −3.7841E−06 | 2.7507E−07 | −1.4789E−08 | 5.8548E−10 |
| R13 | −1.2342E+00 | 4.6461E−07 | 7.5632E−09 | −1.9160E−09 | 1.1039E−10 | −3.6033E−12 |
| R14 | −9.9858E−01 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 7.3239E−03 | 0.0000E+00 | 0.0000E+00 | 0.0000E+00 | 0.0000E+00 | / |
| R2 | −4.6554E−01 | 0.0000E+00 | 0.0000E+00 | 0.0000E+00 | 0.0000E+00 | / |
| R3 | −5.7425E−01 | 0.0000E+00 | 0.0000E+00 | 0.0000E+00 | 0.0000E+00 | / |
| R4 | 7.6343E−01 | 0.0000E+00 | 0.0000E+00 | 0.0000E+00 | 0.0000E+00 | / |
| R5 | −1.8171E+02 | 0.0000E+00 | 0.0000E+00 | 0.0000E+00 | 0.0000E+00 | / |
| R6 | 2.6957E+01 | 0.0000E+00 | 0.0000E+00 | 0.0000E+00 | 0.0000E+00 | / |
| R7 | 2.3348E+01 | 0.0000E+00 | 0.0000E+00 | 0.0000E+00 | 0.0000E+00 | / |
| R8 | −1.1911E+02 | 0.0000E+00 | 0.0000E+00 | 0.0000E+00 | 0.0000E+00 | / |
| R9 | −2.0270E+00 | −4.3206E−08 | 2.4160E−09 | −7.7445E−11 | 1.0846E−12 | / |
| R10 | −1.1829E+00 | 4.4007E−09 | −1.4314E−10 | 2.7806E−12 | −2.4377E−14 | / |

TABLE 2-continued

| R11 | −9.9447E−01 | 2.3679E−10 | −5.5000E−12 | 7.7044E−14 | −4.9281E−16 | / |
| R12 | −4.4958E+00 | −1.6627E−11 | 3.2028E−13 | −3.7386E−15 | 1.9902E−17 | / |
| R13 | −1.2342E+00 | 7.3591E−14 | −9.2830E−16 | 6.5708E−18 | −1.9643E−20 | / |
| R14 | −9.9858E−01 | −1.8904E−13 | 2.0927E−15 | −1.3728E−17 | 4.0358E−20 | / |

For convenience, the aspheric surface of each lens surface uses the aspheric surface shown in the following formula (1). However, the present disclosure is not limited to the aspheric polynomial form shown in formula (1).

$$z = (cr^2)/\{1 + [1(k+1)(c^2r^2)]^{1/2}\} + A4r^4 + A6r^6 + \\ A8r^8 + A10r^{10} + A12r^{12} + A14r^{14} + A16r^{16} + A18r^{18} + \\ A20r^{20} + A22r^{22} + A24r^{24} + A26r^{26} + A28r^{28} + A30r^{30} \quad (1)$$

k is a conic coefficient, A4, A6, A8, A10, A12, A14, A16, A18, A20, A22, A24, A26, A28 and A30 are aspheric coefficients, c is a curvature at a center of an optical surface, r is a vertical distance between a point on an aspheric curve and an optical axis, and z is an aspheric depth (a vertical distance between a point on the aspheric surface and the optical axis, where r is a distance from the point on the aspheric surface to the optical axis, and a vertical distance between the point on the aspheric surface and a tangent plane tangent to a vertex on the aspheric optical axis).

Figure 2:
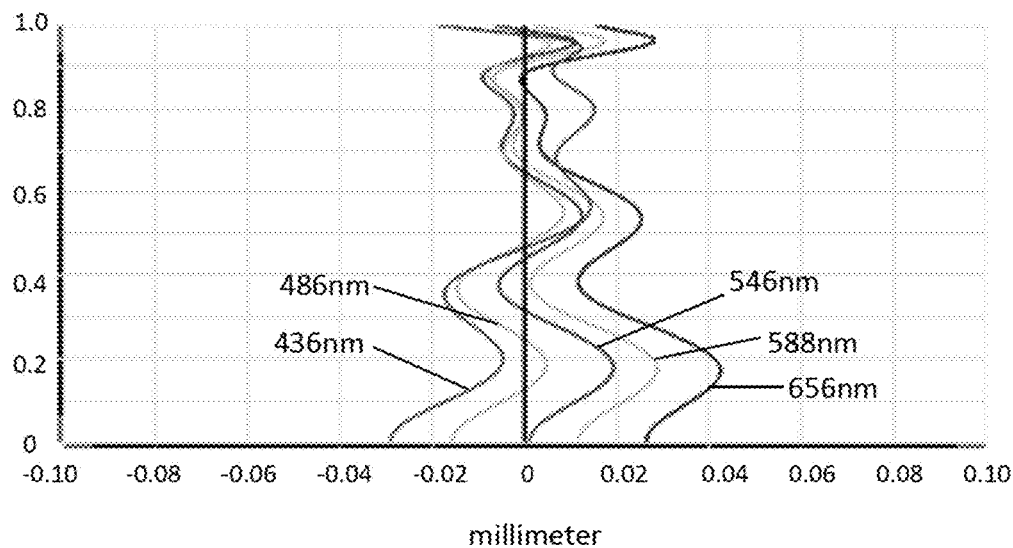
FIG. 2 is a schematic diagram of longitudinal aberration of the camera optical lens shown in FIG. 1.
Figure 3:
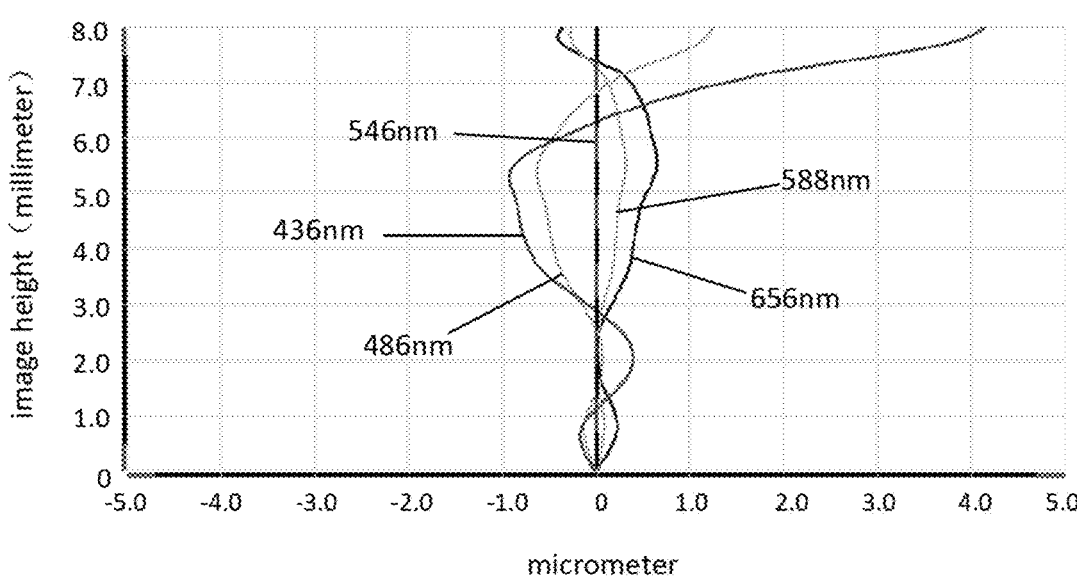
FIG. 3 is a schematic diagram of lateral color of the camera optical lens shown in FIG. 1.
Figure 4:
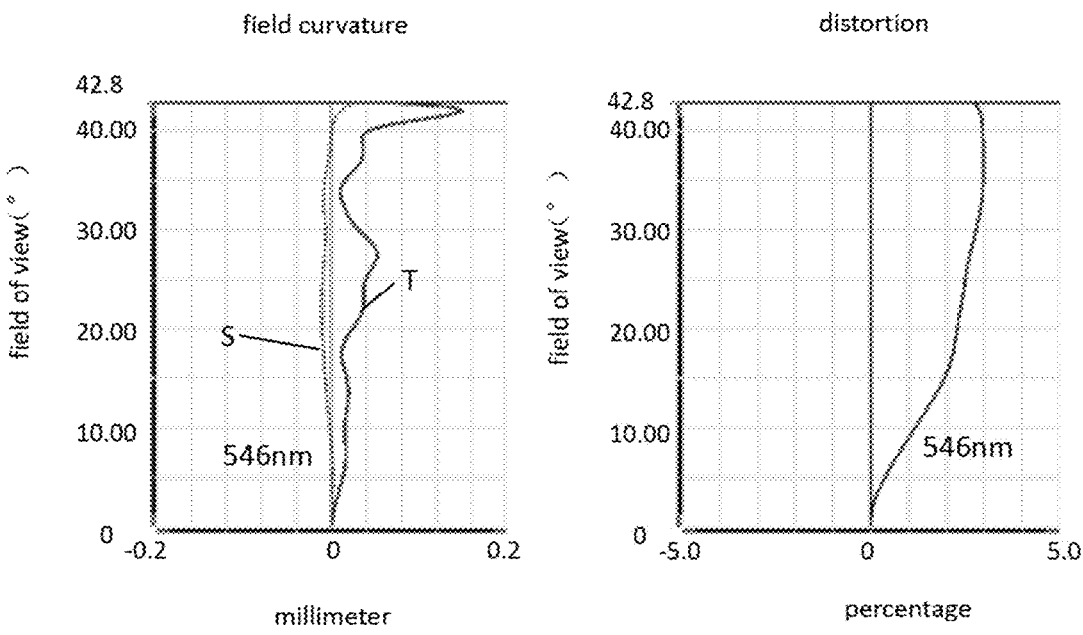
FIG. 4 is a schematic diagram of field curvature and distortion of the camera optical lens shown in FIG. 1.

FIG. 2 and FIG. 3 respectively show longitudinal aberration and lateral color of light with wavelengths of 656 nm, 588 nm, 546 nm, 486 nm and 436 nm after passing through the camera optical lens 10 according to Embodiment 1. FIG. 4 shows field curvature and distortion of light with wavelength 546 nm after passing through the camera optical lens 10 as described in the Embodiment 1, the field curvature S in FIG. 4 is the field curvature in the sagittal direction, and T is the field curvature in the meridional direction.

In the embodiment, the entrance pupil diameter ENPD of the camera optical lens 10 is 4.806 mm, the full field of view (1.0 field of view) image height IH is 8.000 mm, the field of view FOV of the full field of view (1.0 field of view) in the diagonal direction is 85.59°, MIC field of view image height IH is 8.230 mm, and field of view FOV of MIC field of view in the diagonal is 87.37°. The camera optical lens 10 meets the design requirements of large aperture, wide-angle, ultra-thin, diversified structural design and high sensor matching degree, its on-axis and off-axis chromatic aberrations are fully corrected, and has excellent optical characteristics.

It may be understood that the 1.0 field of view image height refers to half of the diagonal length of an effective pixel area of the sensor; the MIC field of view image height refers to a field of view height that is expanded from the 1.0 field of view image height and is used to prevent assembly deviation; the FOV in the diagonal direction of the 1.0 field of view refers to the field of view corresponding to the effective pixel area of the sensor; and the FOV in the diagonal direction of the MIC field of view refers to a field of view corresponding to the MIC field of view image height.

Embodiment 2

The meaning of the reference signs of Embodiment 2 is the same as that of Embodiment 1.

Figure 5:
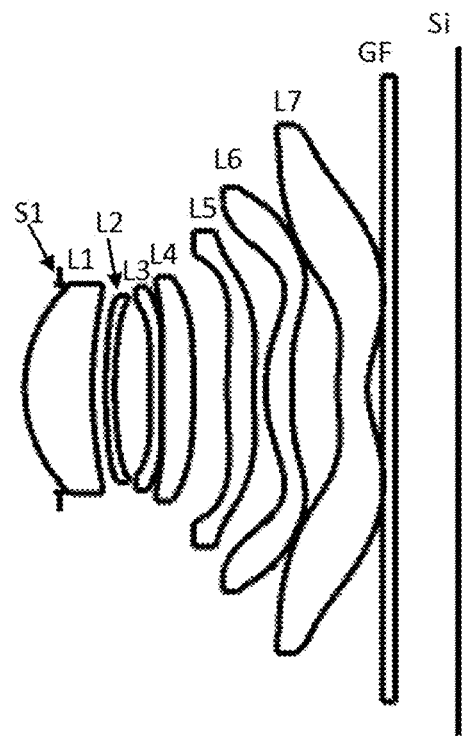
FIG. 5 is a structural schematic diagram of a camera optical lens according to Embodiment 2 of the present disclosure.

FIG. 5 shows a camera optical lens 20 according to Embodiment 2 of the present disclosure.

Table 3 and Table 4 show design data of the camera optical lens 20 according to Embodiment 2 of the present disclosure.

TABLE 3

|  | R |  | d |  | nd |  | vd |  |
|---|---|---|---|---|---|---|---|---|
| S1 | ∞ | d0= | −0.823 | | | | | |
| R1 | 3.473 | d1= | 1.573 | nd1 | 1.4959 | v1 | 81.65 |
| R2 | 9.929 | d2= | 0.310 | | | | | |
| R3 | 11.142 | d3= | 0.217 | nd2 | 1.6700 | v2 | 19.39 |
| R4 | 9.634 | d4= | 0.823 | | | | | |
| R5 | −5002.337 | d5= | 0.252 | nd3 | 1.6700 | v3 | 19.39 |
| R6 | 29.191 | d6= | 0.034 | | | | | |
| R7 | 55.483 | d7= | 0.718 | nd4 | 1.5444 | v4 | 55.82 |
| R8 | −124.338 | d8= | 0.793 | | | | | |
| R9 | 9.501 | d9= | 0.625 | nd5 | 1.5661 | v5 | 37.71 |
| R10 | 7.887 | d10= | 0.285 | | | | | |
| R11 | 4.641 | d11= | 0.607 | nd6 | 1.5444 | v6 | 55.82 |
| R12 | −32.368 | d12= | 1.073 | | | | | |
| R13 | 5.804 | d13= | 0.691 | nd7 | 1.5346 | v7 | 55.69 |
| R14 | 1.917 | d14= | 0.350 | | | | | |
| R15 | ∞ | d15= | 0.310 | ndg | 1.5168 | vg | 64.17 |
| R16 | ∞ | d16= | 1.461 | | | | | |

Table 4 shows aspheric surface data of each lens in the camera optical lens 20 according to Embodiment 2 of the present disclosure.

TABLE 4

|  | Conic Coefficient | Aspheric Coefficient | | | | |
|---|---|---|---|---|---|---|
|  | k | A4 | A6 | A8 | A10 | A12 |
| R1 | 3.6757E−02 | −1.0959E−03 | 3.7280E−03 | −4.5746E−03 | 3.0127E−03 | −1.1707E−03 |
| R2 | 6.5262E−01 | −8.9895E−04 | −2.5140E−03 | 3.7073E−03 | −2.9841E−03 | 1.4116E−03 |
| R3 | −4.0089E+00 | −6.0483E−03 | 1.9522E−03 | −1.8279E−03 | 1.6940E−03 | −8.3618E−04 |
| R4 | 1.4494E+00 | −4.5507E−03 | 2.6078E−03 | −3.5668E−03 | 3.8348E−03 | −2.2927E−03 |
| R5 | 5.6402E+06 | −5.5668E−03 | −4.7710E−03 | 1.9561E−03 | −1.4621E−03 | 7.0712E−04 |
| R6 | −6.3759E+01 | 4.5787E−03 | −1.3351E−02 | 6.3991E−03 | −2.4442E−03 | 6.8517E−04 |
| R7 | −1.1637E+03 | 1.1914E−03 | −8.5232E−03 | 2.5848E−03 | 4.0658E−04 | −4.5824E−04 |
| R8 | 1.4748E+03 | −1.2069E−02 | 2.1024E−03 | −1.7880E−03 | 9.1947E−04 | −2.7413E−04 |
| R9 | 1.0549E+00 | −1.5787E−02 | 1.1002E−03 | 3.0406E−03 | −2.2568E−03 | 7.3337E−04 |
| R10 | −1.7530E+00 | −1.9481E−02 | −1.6084E−02 | 1.5109E−02 | −7.3071E−03 | 2.4200E−03 |
| R11 | −8.7580E−01 | 3.0912E−02 | −2.2884E−02 | 9.6632E−03 | −3.3611E−03 | 8.6952E−04 |

TABLE 4-continued

| | | | | | |
|---|---|---|---|---|---|
| R12 | 1.7554E+01 | 4.5668E-02 | -7.0014E-03 | -2.1905E-03 | 1.1686E-03 | -2.6470E-04 |
| R13 | -2.7705E+00 | -4.9814E-02 | 7.7388E-03 | -1.1389E-03 | 1.4717E-04 | -1.2013E-05 |
| R14 | -1.0150E+00 | -6.4680E-02 | 1.4621E-02 | -2.9546E-03 | 4.6758E-04 | -5.5095E-05 |

| | Conic Coefficient | Aspheric Coefficient | | | | |
|---|---|---|---|---|---|---|
| | k | A14 | A16 | A18 | A20 | A22 |
| R1 | 3.6757E-02 | 2.7751E-04 | -3.9471E-05 | 3.0979E-06 | -1.0323E-07 | 0.0000E+00 |
| R2 | 6.5262E-01 | -4.0379E-04 | 6.8931E-05 | -6.4623E-06 | 2.5535E-07 | 0.0000E+00 |
| R3 | -4.0089E+00 | 2.5045E-04 | -4.4747E-05 | 4.4148E-06 | -1.8616E-07 | 0.0000E+00 |
| R4 | 1.4494E+00 | 8.3286E-04 | -1.8056E-04 | 2.1500E-05 | -1.0783E-06 | 0.0000E+00 |
| R5 | 5.6402E+06 | -2.1539E-04 | 3.9855E-05 | -3.9112E-06 | 1.5129E-07 | 0.0000E+00 |
| R6 | -6.3759E+01 | -1.2892E-04 | 1.4160E-05 | -6.4204E-07 | -2.8083E-09 | 0.0000E+00 |
| R7 | -1.1637E+03 | 1.3562E-04 | -2.1431E-05 | 1.8465E-06 | -6.7688E-08 | 0.0000E+00 |
| R8 | 1.4748E+03 | 5.1329E-05 | -5.9198E-06 | 3.6713E-07 | -8.6270E-09 | 0.0000E+00 |
| R9 | 1.0549E+00 | -7.9510E-05 | -3.0151E-05 | 1.5568E-05 | -3.5220E-06 | 4.8629E-07 |
| R10 | -1.7530E+00 | -5.8265E-04 | 1.0333E-04 | -1.3514E-05 | 1.2972E-06 | -9.0101E-08 |
| R11 | -8.7580E-01 | -1.6116E-04 | 2.1309E-05 | -2.0235E-06 | 1.3871E-07 | -6.8321E-09 |
| R12 | 1.7554E+01 | 3.7888E-05 | -3.7841E-06 | 2.7507E-07 | -1.4789E-08 | 5.8548E-10 |
| R13 | -2.7705E+00 | 4.6461E-07 | 7.5632E-09 | -1.9160E-09 | 1.1039E-10 | -3.6032E-12 |
| R14 | -1.0150E+00 | 4.7645E-06 | -3.0153E-07 | 1.3944E-08 | -4.6848E-10 | 1.1276E-11 |

| | Conic Coefficient | Aspheric Coefficient | | | | |
|---|---|---|---|---|---|---|
| | k | A24 | A26 | A28 | A30 | / |
| R1 | 3.6757E-02 | 0.0000E+00 | 0.0000E+00 | 0.0000E+00 | 0.0000E+00 | / |
| R2 | 6.5262E-01 | 0.0000E+00 | 0.0000E+00 | 0.0000E+00 | 0.0000E+00 | / |
| R3 | -4.0089E+00 | 0.0000E+00 | 0.0000E+00 | 0.0000E+00 | 0.0000E+00 | / |
| R4 | 1.4494E+00 | 0.0000E+00 | 0.0000E+00 | 0.0000E+00 | 0.0000E+00 | / |
| R5 | 5.6402E+06 | 0.0000E+00 | 0.0000E+00 | 0.0000E+00 | 0.0000E+00 | / |
| R6 | -6.3759E+01 | 0.0000E+00 | 0.0000E+00 | 0.0000E+00 | 0.0000E+00 | / |
| R7 | -1.1637E+03 | 0.0000E+00 | 0.0000E+00 | 0.0000E+00 | 0.0000E+00 | / |
| R8 | 1.4748E+03 | 0.0000E+00 | 0.0000E+00 | 0.0000E+00 | 0.0000E+00 | / |
| R9 | 1.0549E+00 | -4.3206E-08 | 2.4160E-09 | -7.7446E-11 | 1.0846E-12 | / |
| R10 | -1.7530E+00 | 4.4007E-09 | -1.4314E-10 | 2.7806E-12 | -2.4377E-14 | / |
| R11 | -8.7580E-01 | 2.3679E-10 | -5.5000E-12 | 7.7044E-14 | -4.9279E-16 | / |
| R12 | 1.7554E+01 | -1.6627E-11 | 3.2028E-13 | -3.7387E-15 | 1.9909E-17 | / |
| R13 | -2.7705E+00 | 7.3592E-14 | -9.2830E-16 | 6.5709E-18 | -1.9644E-20 | / |
| R14 | -1.0150E+00 | -1.8904E-13 | 2.0927E-15 | -1.3728E-17 | 4.0355E-20 | / |

Figure 6:
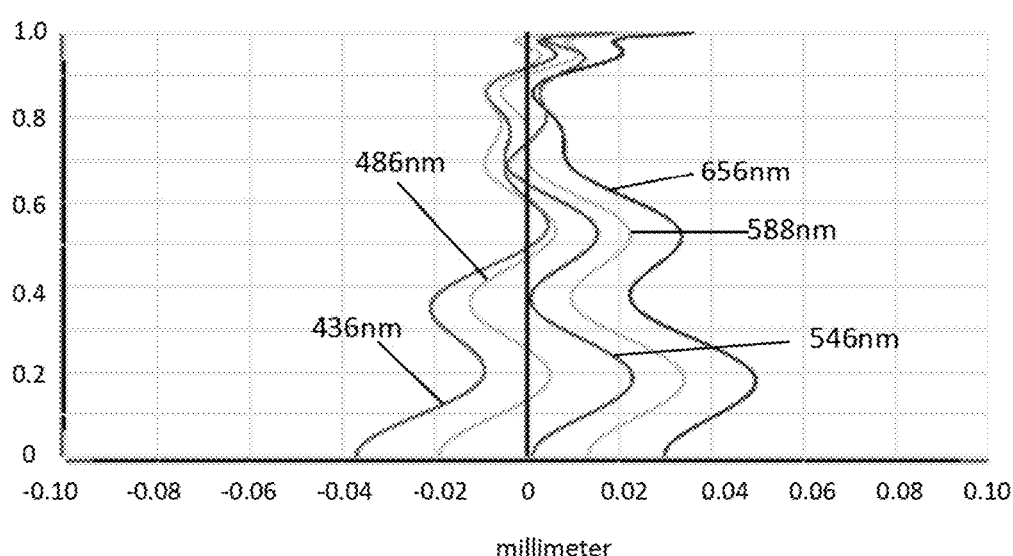
FIG. 6 is a schematic diagram of longitudinal aberration of the camera optical lens shown in FIG. 5.
Figure 7:
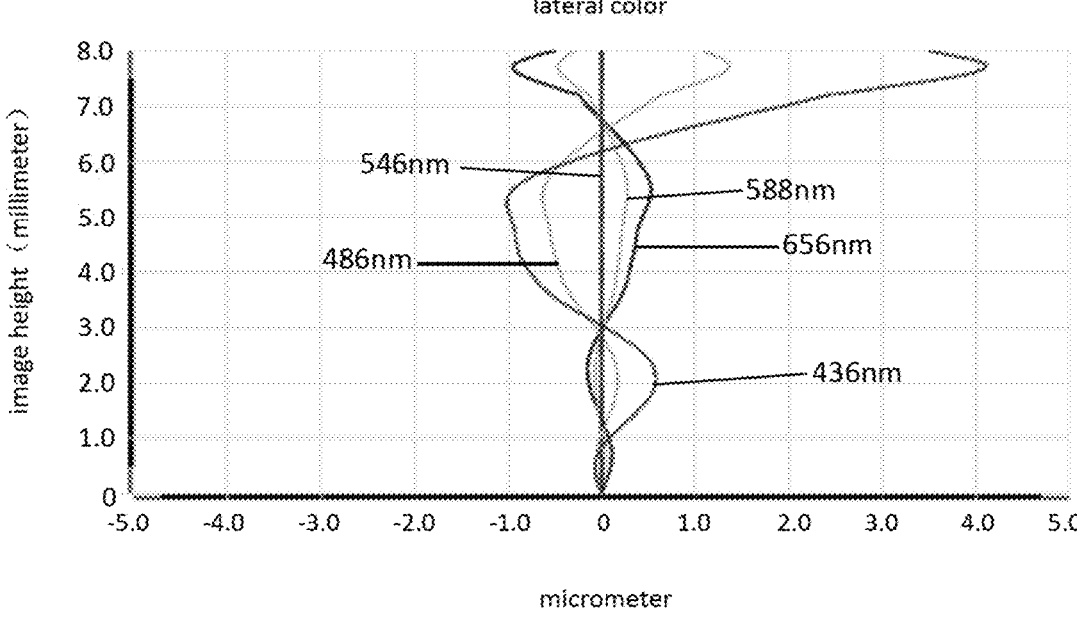
FIG. 7 is a schematic diagram of lateral color of the camera optical lens shown in FIG. 5.
Figure 8:
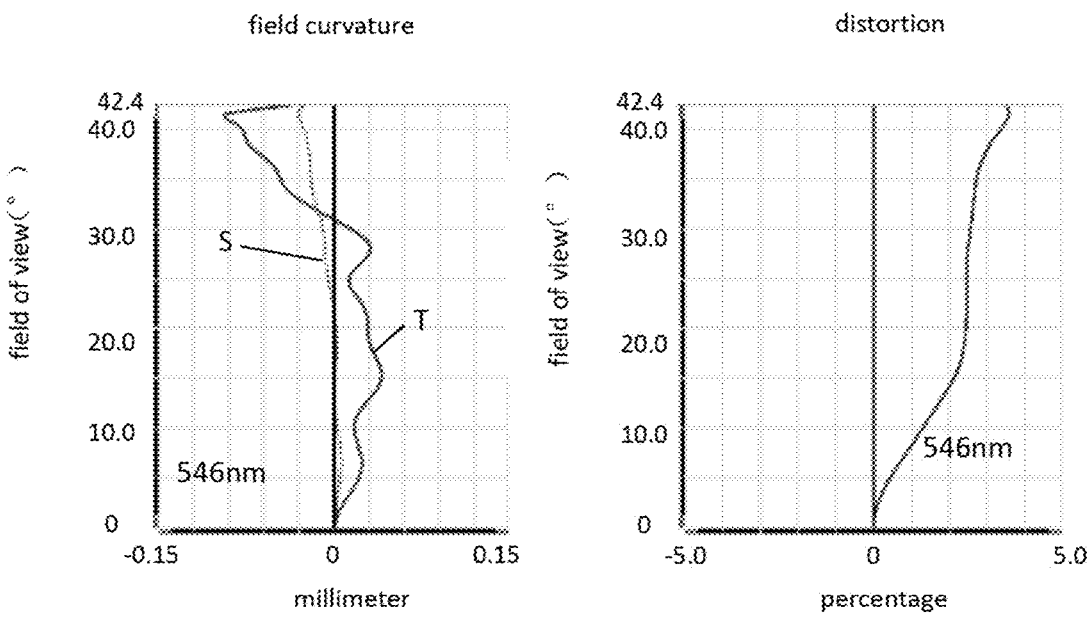
FIG. 8 is a schematic diagram of field curvature and distortion of the camera optical lens shown in FIG. 5.

FIG. 6 and FIG. 7 respectively show longitudinal aberration and lateral color of light with wavelengths of 656 nm, 588 nm, 546 nm, 486 nm and 436 nm after passing through the camera optical lens 20 according to Embodiment 2. FIG. 8 shows field curvature and distortion of light with a wavelength of 546 nm after passing through the camera optical lens 20 according to Embodiment 2. The field curvature S in FIG. 8 is the field curvature in the sagittal direction, and T is the field curvature in the meridian direction.

In the embodiment, the entrance pupil diameter ENPD of the camera optical lens 20 is 4.926 mm, the full field of view (1.0 field of view) image height IH is 8.000 mm, the field of view FOV of the full field of view (1.0 field of view) in a diagonal direction is 84.77°, the MIC field of view image height IH is 8.230 mm, the field of view FOV of the MIC field of view in a diagonal direction is 86.60°, the camera optical lens 20 meets the design requirements of large aperture, wide-angle, ultra-thin, diversified structure design and high sensor matching degree, the on-axis and off-axis color aberrations are fully corrected.

Embodiment 3

The meaning of the reference signs of Embodiment 3 is the same as that of Embodiment 1.

Figure 9:
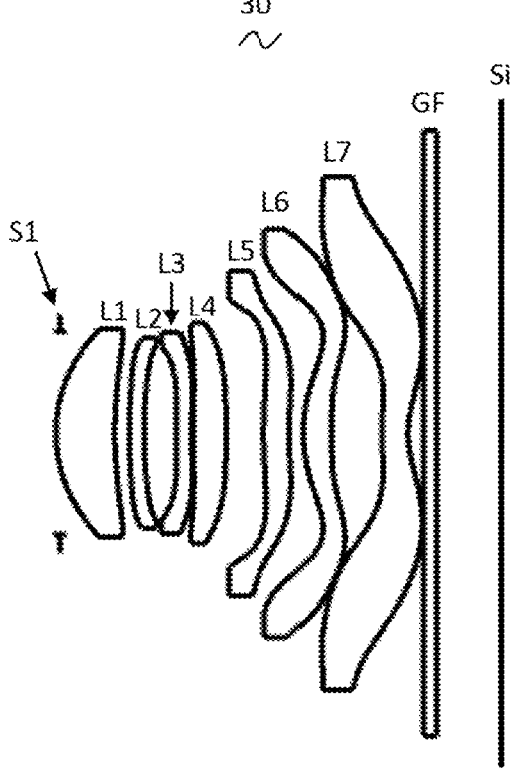
FIG. 9 is a structural schematic diagram of a camera optical lens according to Embodiment 3 of the present disclosure.

FIG. 9 shows a camera optical lens 30 according to Embodiment 3 of the present disclosure.

Table 5 and Table 6 show design data of the camera optical lens 30 according to the Embodiment 3 of the present disclosure.

TABLE 5

| | R | | d | nd | | vd | |
|---|---|---|---|---|---|---|---|
| S1 | ∞ | d0= | -0.090 | | | | |
| R1 | 3.537 | d1= | 1.340 | nd1 | 1.4959 | v1 | 81.65 |
| R2 | 10.359 | d2= | 0.330 | | | | |
| R3 | 13.001 | d3= | 0.335 | nd2 | 1.6700 | v2 | 19.39 |
| R4 | 10.572 | d4= | 0.747 | | | | |
| R5 | -97.461 | d5= | 0.338 | nd3 | 1.6700 | v3 | 19.39 |
| R6 | 35.078 | d6= | 0.034 | | | | |
| R7 | 28.871 | d7= | 0.744 | nd4 | 1.5444 | v4 | 55.82 |
| R8 | -72.109 | d8= | 0.868 | | | | |
| R9 | 10.111 | d9= | 0.579 | nd5 | 1.5661 | v5 | 37.71 |
| R10 | 7.105 | d10= | 0.330 | | | | |
| R11 | 4.436 | d11= | 0.650 | nd6 | 1.5444 | v6 | 55.82 |
| R12 | -35.069 | d12= | 1.140 | | | | |
| R13 | 8.094 | d13= | 0.588 | nd7 | 1.5346 | v7 | 55.69 |
| R14 | 2.431 | d14= | 0.350 | | | | |
| R15 | ∞ | d15= | 0.310 | ndg | 1.5168 | vg | 64.17 |
| R16 | ∞ | d16= | 1.467 | | | | |

Table 6 shows aspheric surface data of each lens in the camera optical lens 30 according to Embodiment 3 of the present disclosure.

TABLE 6

| Conic Coefficient | Aspheric Coefficient | | | | |
|---|---|---|---|---|---|
| k | A4 | A6 | A8 | A10 | A12 |
| R1 | 0.0000E+00 | −1.1993E−03 | 3.6725E−03 | −4.5845E−03 | 3.0115E−03 | −1.1706E−03 |
| R2 | 0.0000E+00 | −2.0868E−03 | −2.4311E−03 | 3.6306E−03 | −2.9621E−03 | 1.4108E−03 |
| R3 | 0.0000E+00 | −6.1236E−03 | 1.9643E−03 | −1.8345E−03 | 1.6957E−03 | −8.3480E−04 |
| R4 | 0.0000E+00 | −4.3231E−03 | 2.8029E−03 | −3.7708E−03 | 3.8939E−03 | −2.2972E−03 |
| R5 | 0.0000E+00 | −5.8549E−03 | −4.7582E−03 | 2.0554E−03 | −1.4567E−03 | 7.0221E−04 |
| R6 | 0.0000E+00 | 4.4896E−03 | −1.3329E−02 | 6.5635E−03 | −2.4498E−03 | 6.8019E−04 |
| R7 | 0.0000E+00 | 1.4950E−03 | −8.5217E−03 | 2.5820E−03 | 4.0780E−04 | −4.5790E−04 |
| R8 | 0.0000E+00 | −1.1350E−02 | 1.9601E−03 | −1.7533E−03 | 9.0312E−04 | −2.7225E−04 |
| R9 | −1.0000E+00 | −1.6912E−02 | 1.3176E−03 | 3.0338E−03 | −2.2594E−03 | 7.3333E−04 |
| R10 | −1.0000E+00 | −1.9480E−02 | −1.6143E−02 | 1.5110E−02 | −7.3072E−03 | 2.4200E−03 |
| R11 | −1.0000E+00 | 3.0823E−02 | −2.2883E−02 | 9.6637E−03 | −3.3610E−03 | 8.6953E−04 |
| R12 | −1.0000E+00 | 4.6043E−02 | −7.0266E−03 | −2.1885E−03 | 1.1686E−03 | −2.6470E−04 |
| R13 | −1.0000E+00 | −4.8935E−02 | 7.7143E−03 | −1.1390E−03 | 1.4717E−04 | −1.2012E−05 |
| R14 | −1.0000E+00 | −6.4016E−02 | 1.4619E−02 | −2.9548E−03 | 4.6757E−04 | −5.5095E−05 |

| Conic Coefficient | Aspheric Coefficient | | | | |
|---|---|---|---|---|---|
| k | A14 | A16 | A18 | A20 | A22 |
| R1 | 0.0000E+00 | 2.7749E−04 | −3.9471E−05 | 3.0977E−06 | −1.0333E−07 | 0.0000E+00 |
| R2 | 0.0000E+00 | −4.0403E−04 | 6.8901E−05 | −6.4539E−06 | 2.5490E−07 | 0.0000E+00 |
| R3 | 0.0000E+00 | 2.5054E−04 | −4.4797E−05 | 4.4023E−06 | −1.8401E−07 | 0.0000E+00 |
| R4 | 0.0000E+00 | 8.3103E−04 | −1.8011E−04 | 2.1485E−05 | −1.0804E−06 | 0.0000E+00 |
| R5 | 0.0000E+00 | −2.1546E−04 | 3.9844E−05 | −3.8801E−06 | 1.4951E−07 | 0.0000E+00 |
| R6 | 0.0000E+00 | −1.2829E−04 | 1.4097E−05 | −6.4366E−07 | −1.8258E−09 | 0.0000E+00 |
| R7 | 0.0000E+00 | 1.3575E−04 | −2.1442E−05 | 1.8368E−06 | −6.6552E−08 | 0.0000E+00 |
| R8 | 0.0000E+00 | 5.1653E−05 | −5.9516E−06 | 3.5822E−07 | −7.6005E−09 | 0.0000E+00 |
| R9 | −1.0000E+00 | −7.9485E−05 | −3.0151E−05 | 1.5568E−05 | −3.5220E−06 | 4.8629E−07 |
| R10 | −1.0000E+00 | −5.8265E−04 | 1.0333E−04 | −1.3514E−05 | 1.2972E−06 | −9.0101E−08 |
| R11 | −1.0000E+00 | −1.6116E−04 | 2.1309E−05 | −2.0235E−06 | 1.3871E−07 | −6.8321E−09 |
| R12 | −1.0000E+00 | 3.7888E−05 | −3.7841E−06 | 2.7507E−07 | −1.4789E−08 | 5.8548E−10 |
| R13 | −1.0000E+00 | 4.6461E−07 | 7.5632E−09 | −1.9160E−09 | 1.1039E−10 | −3.6033E−12 |
| R14 | −1.0000E+00 | 4.7645E−06 | −3.0153E−07 | 1.3944E−08 | −4.6848E−10 | 1.1276E−11 |

| Conic Coefficient | Aspheric Coefficient | | | | |
|---|---|---|---|---|---|
| k | A24 | A26 | A28 | A30 | / |
| R1 | 0.0000E+00 | 0.0000E+00 | 0.0000E+00 | 0.0000E+00 | 0.0000E+00 | / |
| R2 | 0.0000E+00 | 0.0000E+00 | 0.0000E+00 | 0.0000E+00 | 0.0000E+00 | / |
| R3 | 0.0000E+00 | 0.0000E+00 | 0.0000E+00 | 0.0000E+00 | 0.0000E+00 | / |
| R4 | 0.0000E+00 | 0.0000E+00 | 0.0000E+00 | 0.0000E+00 | 0.0000E+00 | / |
| R5 | 0.0000E+00 | 0.0000E+00 | 0.0000E+00 | 0.0000E+00 | 0.0000E+00 | / |
| R6 | 0.0000E+00 | 0.0000E+00 | 0.0000E+00 | 0.0000E+00 | 0.0000E+00 | / |
| R7 | 0.0000E+00 | 0.0000E+00 | 0.0000E+00 | 0.0000E+00 | 0.0000E+00 | / |
| R8 | 0.0000E+00 | 0.0000E+00 | 0.0000E+00 | 0.0000E+00 | 0.0000E+00 | / |
| R9 | −1.0000E+00 | −4.3206E−08 | 2.4160E−09 | −7.7446E−11 | 1.0846E−12 | / |
| R10 | −1.0000E+00 | 4.4007E−09 | −1.4314E−10 | 2.7806E−12 | −2.4377E−14 | / |
| R11 | −1.0000E+00 | 2.3679E−10 | −5.5000E−12 | 7.7044E−14 | −4.9281E−16 | / |
| R12 | −1.0000E+00 | −1.6627E−11 | 3.2028E−13 | −3.7386E−15 | 1.9902E−17 | / |
| R13 | −1.0000E+00 | 7.3591E−14 | −9.2830E−16 | 6.5708E−18 | −1.9643E−20 | / |
| R14 | −1.0000E+00 | −1.8904E−13 | 2.0927E−15 | −1.3728E−17 | 4.0358E−20 | / |

Figure 10:
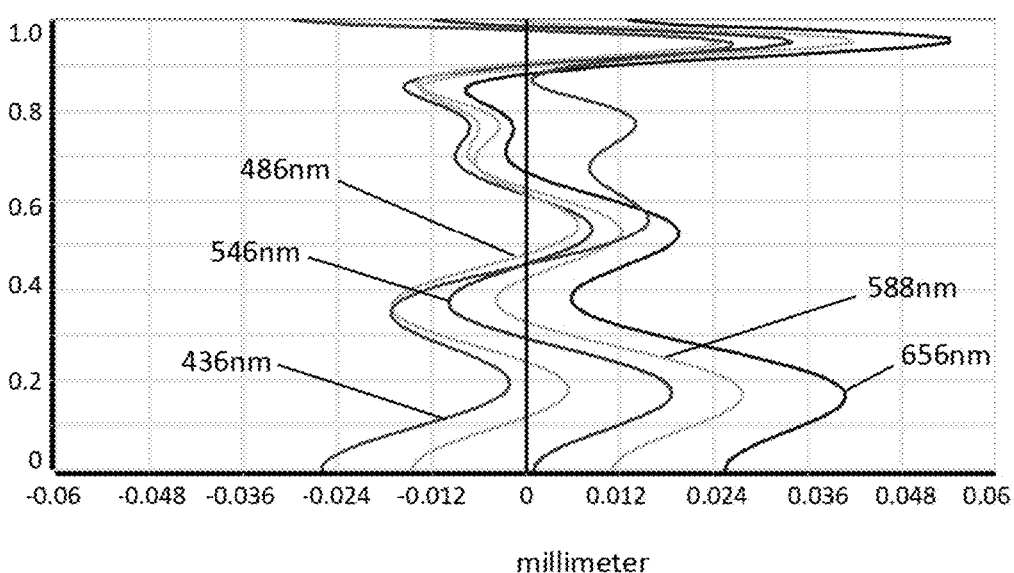
FIG. 10 is a schematic diagram of longitudinal aberration of the camera optical lens shown in FIG. 9.
Figure 11:
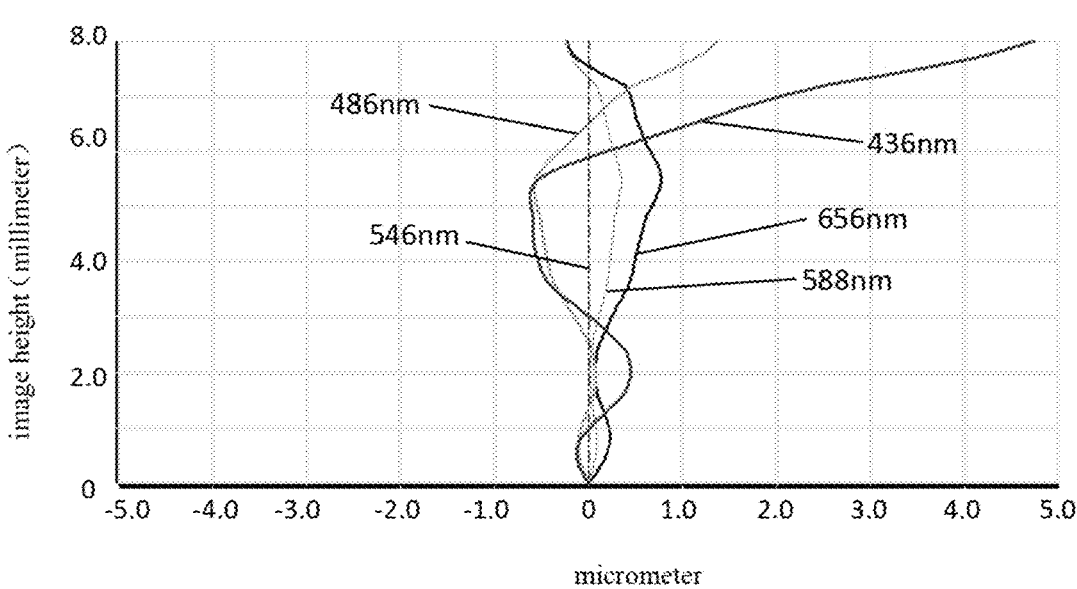
FIG. 11 is a schematic diagram of lateral color of the camera optical lens shown in FIG. 9.
Figure 12:
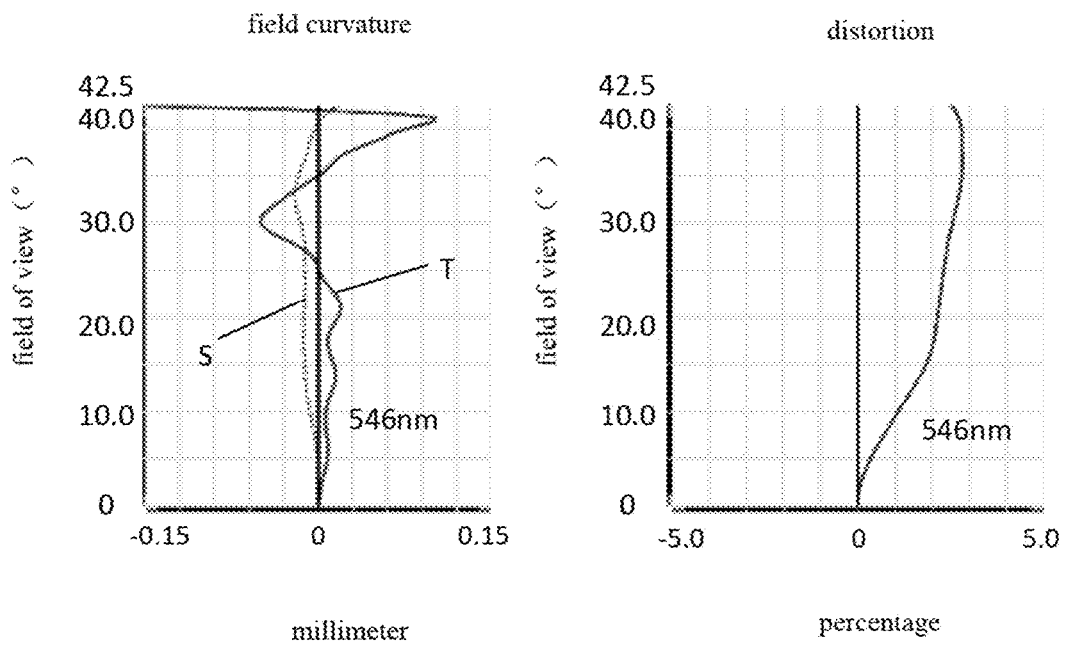
FIG. 12 is a schematic diagram of field curvature and distortion of the camera optical lens shown in FIG. 9.

FIG. 10 and FIG. 11 respectively show longitudinal aberration and lateral color of light with wavelengths of 656 nm, 588 nm, 546 nm, 486 nm and 436 nm after passing through the camera optical lens 30 according to Embodiment 3. FIG. 12 shows field curvature and distortion of light with a wavelength of 546 nm after passing through the camera optical lens 30 according to Embodiment 3. The field curvature S in FIG. 12 is the field curvature in the sagittal direction, and T is the field curvature in the meridian direction.

In the embodiment, the entrance pupil diameter ENPD of the camera optical lens 30 is 4.868 mm, the full field of view (1.0 field of view) image height IH is 8.000 mm, the field of view FOV of the full field of view (1.0 field of view) in a diagonal direction is 84.97°, the MIC field of view image height IH is 8.290 mm, the field of view FOV of the MIC field of view in a diagonal direction is 87.18°, the camera optical lens 30 meets the design requirements of large aperture, wide-angle, ultra-thin, diversified structure design and high sensor matching degree, the on-axis and off-axis color aberrations are fully corrected.

Embodiment 4

The meaning of the reference signs of Embodiment 4 is the same as that of Embodiment 1.

Figure 13:
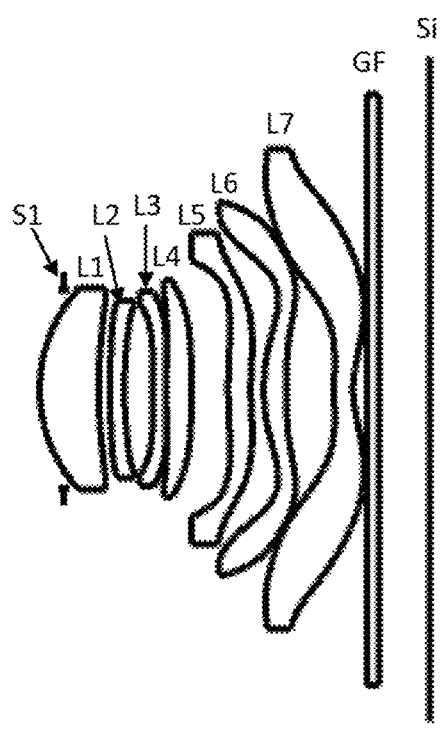
FIG. 13 is a structural schematic diagram of a camera optical lens according to Embodiment 4 of the present disclosure.

FIG. 13 shows a camera optical lens 40 according to Embodiment 4 of the present disclosure.

Table 7 and Table 8 show design data of the camera optical lens 40 according to Embodiment 4 of the present disclosure.

TABLE 7

| | R | | d | | nd | | vd |
|---|---|---|---|---|---|---|---|
| S1 | ∞ | d0= | −0.629 | | | | |
| R1 | 3.536 | d1= | 1.522 | nd1 | 1.4959 | v1 | 81.65 |
| R2 | 10.049 | d2= | 0.290 | | | | |
| R3 | 13.556 | d3= | 0.383 | nd2 | 1.6700 | v2 | 19.39 |
| R4 | 10.641 | d4= | 0.733 | | | | |
| R5 | −9865.478 | d5= | 0.330 | nd3 | 1.6700 | v3 | 19.39 |
| R6 | 28.882 | d6= | 0.022 | | | | |
| R7 | 21.672 | d7= | 0.643 | nd4 | 1.5444 | v4 | 55.82 |
| R8 | −71.762 | d8= | 0.957 | | | | |
| R9 | 13.406 | d9= | 0.598 | nd5 | 1.5661 | v5 | 37.71 |
| R10 | 7.064 | d10= | 0.337 | | | | |

TABLE 7-continued

| | R | | d | | nd | | vd |
|---|---|---|---|---|---|---|---|
| R11 | 4.784 | d11= | 0.605 | nd6 | 1.5444 | v6 | 55.82 |
| R12 | −23.986 | d12= | 1.219 | | | | |
| R13 | 10.383 | d13= | 0.488 | nd7 | 1.5346 | v7 | 55.69 |
| R14 | 2.857 | d14= | 0.350 | | | | |
| R15 | ∞ | d15= | 0.310 | ndg | 1.5168 | vg | 64.17 |
| R16 | ∞ | d16= | 1.317 | | | | |

Table 8 shows aspheric surface data of each lens in the camera optical lens 40 according to Embodiment 4 of the present disclosure.

TABLE 8

| | Conic Coefficient | Aspheric Coefficient | | | | |
|---|---|---|---|---|---|---|
| | k | A4 | A6 | A8 | A10 | A12 |
| R1 | 9.0179E−03 | −1.3327E−03 | 3.7023E−03 | −4.5799E−03 | 3.0113E−03 | −1.1707E−03 |
| R2 | −1.4871E+00 | −2.1590E−03 | −2.4149E−03 | 3.6317E−03 | −2.9621E−03 | 1.4107E−03 |
| R3 | −5.8004E+00 | −6.0393E−03 | 1.8868E−03 | −1.8445E−03 | 1.6916E−03 | −8.3558E−04 |
| R4 | 1.1706E+00 | −4.0419E−03 | 2.7512E−03 | −3.7686E−03 | 3.8921E−03 | −2.2976E−03 |
| R5 | 0.0000E+00 | −5.1596E−03 | −4.7097E−03 | 2.0595E−03 | −1.4559E−03 | 7.0213E−04 |
| R6 | −6.8133E+01 | 4.1009E−03 | −1.3369E−02 | 6.5581E−03 | −2.4513E−03 | 6.8004E−04 |
| R7 | −5.5824E+01 | 8.3252E−04 | −8.5764E−03 | 2.5885E−03 | 4.0938E−04 | −4.5785E−04 |
| R8 | 4.3677E+02 | −1.0905E−02 | 2.0348E−03 | −1.7563E−03 | 9.0169E−04 | −2.7260E−04 |
| R9 | −7.3090E+00 | −1.6561E−02 | 1.3200E−03 | 3.0353E−03 | −2.2599E−03 | 7.3329E−04 |
| R10 | −1.2222E+00 | −1.9394E−02 | −1.6157E−02 | 1.5110E−02 | −7.3071E−03 | 2.4200E−03 |
| R11 | −1.1242E+00 | 3.0847E−02 | −2.2888E−02 | 9.6636E−03 | −3.3611E−03 | 8.6953E−04 |
| R12 | −1.9833E+01 | 4.6022E−02 | −7.0322E−03 | −2.1893E−03 | 1.1686E−03 | −2.6470E−04 |
| R13 | −8.3176E−01 | −4.8817E−02 | 7.7166E−03 | −1.1389E−03 | 1.4717E−04 | −1.2012E−05 |
| R14 | −9.9085E−01 | −6.4072E−02 | 1.4617E−02 | −2.9549E−03 | 4.6757E−04 | −5.5095E−05 |

| | Conic Coefficient | Aspheric Coefficient | | | | |
|---|---|---|---|---|---|---|
| | k | A14 | A16 | A18 | A20 | A22 |
| R1 | 9.0179E−03 | 2.7749E−04 | −3.9470E−05 | 3.0980E−06 | −1.0329E−07 | 0.0000E+00 |
| R2 | −1.4871E+00 | −4.0405E−04 | 6.8902E−05 | −6.4533E−06 | 2.5514E−07 | 0.0000E+00 |
| R3 | −5.8004E+00 | 2.5044E−04 | −4.4801E−05 | 4.4041E−06 | −1.8358E−07 | 0.0000E+00 |
| R4 | 1.1706E+00 | 8.3089E−04 | −1.8013E−04 | 2.1481E−05 | −1.0806E−06 | 0.0000E+00 |
| R5 | 0.0000E+00 | −2.1565E−04 | 3.9811E−05 | −3.8838E−06 | 1.4854E−07 | 0.0000E+00 |
| R6 | −6.8133E+01 | −1.2828E−04 | 1.4100E−05 | −6.4484E−07 | −2.1988E−09 | 0.0000E+00 |
| R7 | −5.5824E+01 | 1.3571E−04 | −2.1447E−05 | 1.8363E−06 | −6.6531E−08 | 0.0000E+00 |
| R8 | 4.3677E+02 | 5.1628E−05 | −5.9500E−06 | 3.5853E−07 | −7.5263E−09 | 0.0000E+00 |
| R9 | −7.3090E+00 | −7.9477E−05 | −3.0151E−05 | 1.5568E−05 | −3.5220E−06 | 4.8629E−07 |
| R10 | −1.2222E+00 | −5.8265E−04 | 1.0333E−04 | −1.3514E−05 | 1.2972E−06 | −9.0101E−08 |
| R11 | −1.1242E+00 | −1.6116E−04 | 2.1309E−05 | −2.0235E−06 | 1.3871E−07 | −6.8321E−09 |
| R12 | −1.9833E+01 | 3.7888E−05 | −3.7841E−06 | 2.7507E−07 | −1.4789E−08 | 5.8548E−10 |
| R13 | −8.3176E−01 | 4.6461E−07 | 7.5632E−09 | −1.9160E−09 | 1.1039E−10 | −3.6033E−12 |
| R14 | −9.9085E−01 | 4.7645E−06 | −3.0153E−07 | 1.3944E−08 | −4.6848E−10 | 1.1276E−11 |

| | Conic Coefficient | Aspheric Coefficient | | | | |
|---|---|---|---|---|---|---|
| | k | A24 | A26 | A28 | A30 | / |
| R1 | 9.0179E−03 | 0.0000E+00 | 0.0000E+00 | 0.0000E+00 | 0.0000E+00 | / |
| R2 | −1.4871E+00 | 0.0000E+00 | 0.0000E+00 | 0.0000E+00 | 0.0000E+00 | / |
| R3 | −5.8004E+00 | 0.0000E+00 | 0.0000E+00 | 0.0000E+00 | 0.0000E+00 | / |
| R4 | 1.1706E+00 | 0.0000E+00 | 0.0000E+00 | 0.0000E+00 | 0.0000E+00 | / |
| R5 | 0.0000E+00 | 0.0000E+00 | 0.0000E+00 | 0.0000E+00 | 0.0000E+00 | / |
| R6 | −6.8133E+01 | 0.0000E+00 | 0.0000E+00 | 0.0000E+00 | 0.0000E+00 | / |
| R7 | −5.5824E+01 | 0.0000E+00 | 0.0000E+00 | 0.0000E+00 | 0.0000E+00 | / |
| R8 | 4.3677E+02 | 0.0000E+00 | 0.0000E+00 | 0.0000E+00 | 0.0000E+00 | / |
| R9 | −7.3090E+00 | −4.3206E−08 | 2.4160E−09 | −7.7445E−11 | 1.0846E−12 | / |
| R10 | −1.2222E+00 | 4.4007E−09 | −1.4314E−10 | 2.7806E−12 | −2.4377E−14 | / |
| R11 | −1.1242E+00 | 2.3679E−10 | −5.5000E−12 | 7.7044E−14 | −4.9281E−16 | / |
| R12 | −1.9833E+01 | −1.6627E−11 | 3.2028E−13 | −3.7387E−15 | 1.9902E−17 | / |
| R13 | −8.3176E−01 | 7.3591E−14 | −9.2830E−16 | 6.5708E−18 | −1.9643E−20 | / |
| R14 | −9.9085E−01 | −1.8904E−13 | 2.0927E−15 | −1.3728E−17 | 4.0358E−20 | / |

Figure 14:
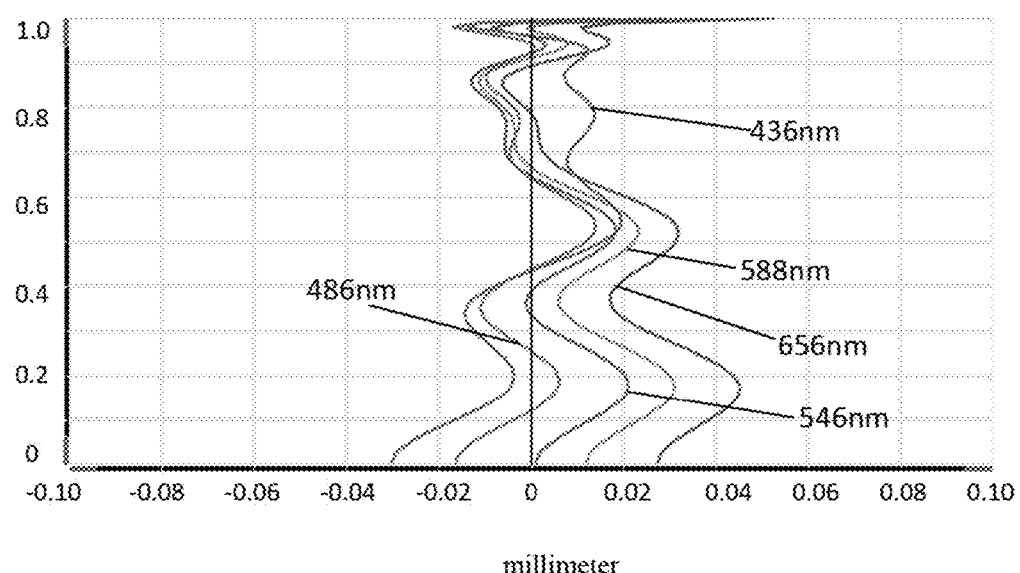
FIG. 14 is a schematic diagram of longitudinal aberration of the camera optical lens shown in FIG. 13.
Figure 15:
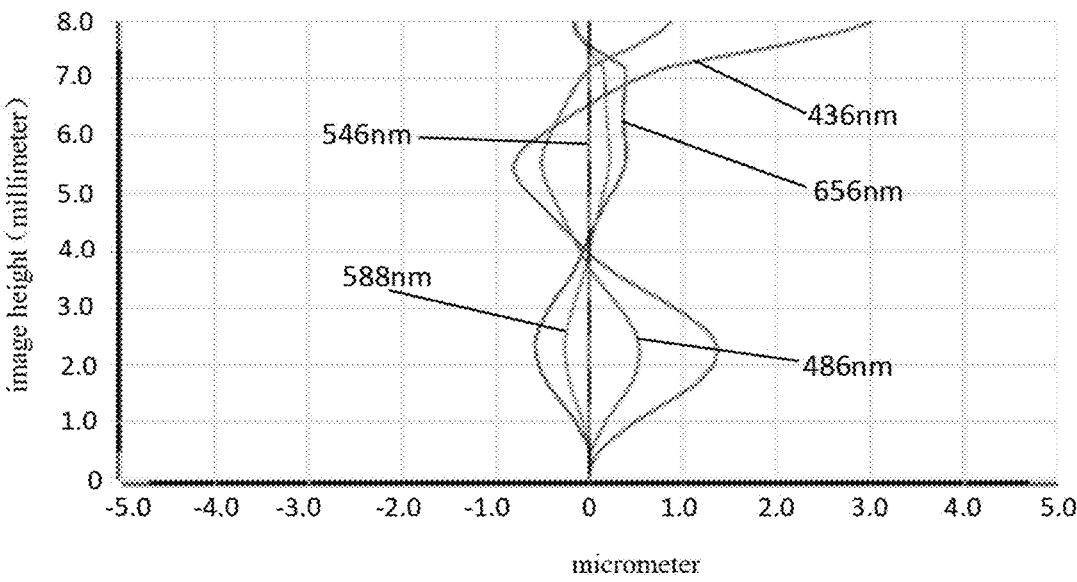
FIG. 15 is a schematic diagram of lateral color of the camera optical lens shown in FIG. 13.
Figure 16:
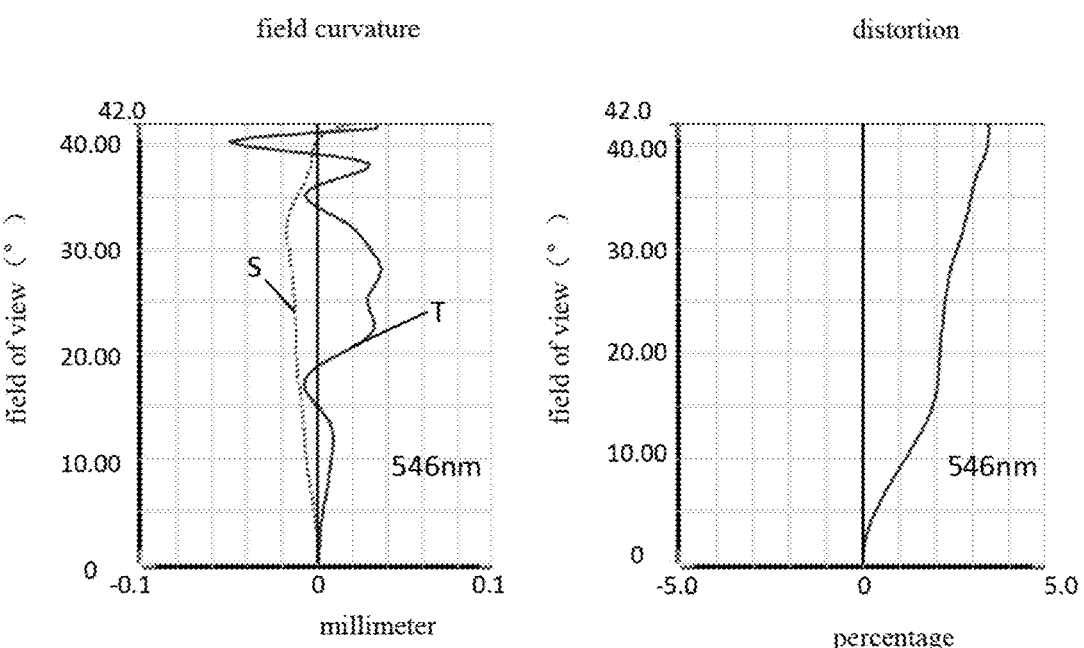
FIG. 16 is a schematic diagram of field curvature and distortion of the camera optical lens shown in FIG. 13.

FIG. 14 and FIG. 15 respectively show longitudinal aberration and lateral color of light with wavelengths of 656 nm, 588 nm, 546 nm, 486 nm and 436 nm after passing through the camera optical lens 40 according to Embodiment 4. FIG. 16 shows field curvature and distortion of light with a wavelength of 546 nm after passing through the camera optical lens 40 according to Embodiment 4. The field curvature S in FIG. 16 is the field curvature in the sagittal direction, and T is the field curvature in the meridian direction.

In the embodiment, the entrance pupil diameter ENPD of the camera optical lens 40 is 4.918 mm, the full field of view (1.0 field of view) image height IH is 8.000 mm, the field of view FOV of the full field of view (1.0 field of view) in a diagonal direction is 84.00°, the MIC field of view image height IH is 8.230 mm, the field of view FOV of the MIC field of view in a diagonal direction is 85.71°, the camera optical lens 40 meets the design requirements of large aperture, wide-angle, ultra-thin, diversified structure design and high sensor matching degree, the on-axis and off-axis color aberrations are fully corrected.

TABLE 9

| Parameters and Relational Expressions | Embodiment 1 | Embodiment 2 | Embodiment 3 | Embodiment 4 |
|---|---|---|---|---|
| f3/f4 | −1.00 | −0.61 | −1.01 | −1.39 |
| R9/R10 | 1.49 | 1.20 | 1.42 | 1.90 |
| ENPD/Tan(FOV/2) | 5.19 | 5.40 | 5.32 | 5.46 |
| d2/d4 | 0.46 | 0.38 | 0.44 | 0.40 |
| Sin(A1.0out14)*R14/f7 | 0.001 | 0.001 | −0.225 | 0.002 |
| (f1 + f2 + f3 + f4)/ (f5 + f6 + f7) | 1.65 | 1.31 | 1.67 | 1.91 |
| Sin(A0.8out8)*R8/f4 | 0.02 | 0.04 | −1.13 | 0.06 |
| f1/R1 + f4/R8 | 2.06 | 2.30 | 2.34 | 2.45 |
| f2/R4 + f3/R5 | −7.83 | −11.56 | −7.97 | −7.24 |
| CRAmax | 37.40 | 36.20 | 37.80 | 39.20 |
| f | 8.41 | 8.472 | 8.518 | 8.591 |
| f1 | 10.008 | 9.935 | 10.136 | 10.178 |
| f2 | −89.864 | −111.424 | −88.341 | −77.072 |
| f3 | −40.121 | −42.795 | −37.997 | −42.465 |
| f4 | 40.011 | 70.27 | 37.808 | 30.519 |
| f5 | −49.524 | −57.128 | −47.993 | −42.8 |
| f6 | 7.675 | 8.089 | 7.617 | 7.554 |
| f7 | −6.664 | −7.507 | −6.635 | −6.029 |
| FNO | 1.750 | 1.720 | 1.750 | 1.747 |
| TTL | 10.081 | 10.122 | 10.150 | 10.104 |

Those skilled in the art may understand that the above embodiments are specific embodiments for implementing the present disclosure, and in practical applications, various changes may be made in form and detail without departing from the spirit and scope of the present disclosure.

What is claimed is:

1. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

wherein an object side surface of the first lens is convex in a paraxial region, and an image side surface of the first lens is concave in a paraxial region; an object side surface of the second lens is convex in a paraxial region, and an image side surface of the second lens is concave in a paraxial region; an object side surface of the third lens is concave in a paraxial region, and an image side surface of the third lens is concave in a paraxial region; an object side surface of the fourth lens is convex in a paraxial region, and an image side surface of the fourth lens is convex in a paraxial region; an object side surface of the fifth lens is convex in a paraxial region, and an image side surface of the fifth lens is concave in a paraxial region; an object side surface of the sixth lens is convex in a paraxial region, and an image side surface of the sixth lens is convex in a paraxial region; an object side surface of the seventh lens is convex in a paraxial region, and an image side surface of the seventh lens is concave in a paraxial region;

wherein a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, a central curvature radius of the image side surface of the fourth lens in the paraxial region is R8, a central curvature radius of the object side surface of the fifth lens in the paraxial region is R9, a central curvature radius of the image side surface of the fifth lens in the paraxial region is R10, a central curvature radius of the image side surface of the seventh lens in the paraxial region is R14, an entrance pupil diameter of the camera optical lens is ENPD, the field of view of the 1.0 field of view of the camera optical lens is FOV, an on-axis distance from the image side surface of the first lens to the object side surface of the second lens is d2, an on-axis distance from the image side surface of the second lens to the object side surface of the third lens is d4, an angle between a chief ray of the 1.0 field of view of the camera optical lens and an optical axis when it is emitted from the image side surface of the seventh lens is Sin(A1.0out14), an angle between the chief ray of the 0.8 field of view of the camera optical lens and the optical axis when it is emitted from the image side surface of the fourth lens is Sin(A0.8out8), and following relational expressions are satisfied:

$$-1.40 \le f3/f4 \le -0.60;$$

$$1.20 \le R9/R10 \le 1.90;$$

$$5.10 \le ENPD/\mathrm{Tan}(FOV/2) \le 5.70;$$

$$0.30 \le d2/d4 \le 0.60;$$

$$-0.300 \le \mathrm{Sin}(A1.0out14)*R14/f7 \le 0.003;$$

$$1.05 \le (f1 + f2 + f3 + f4)/(f5 + f6 + f7) \le 2.30; \text{ and}$$

$$-1.40 \le \mathrm{Sin}(A0.8out8)*R8/f4 \le 0.10.$$

2. The camera optical lens as described in claim 1, wherein following relational expression is satisfied: 0.30≤d2/d4≤0.50.

3. The camera optical lens as described in claim 1, wherein following relational expression is satisfied: −0.230≤Sin(A1.0out14)*R14/f7≤0.003.

4. The camera optical lens as described in claim 1, wherein following relational expression is satisfied: 1.25≤ (f1+f2+f3+f4)/(f5+f6+f7)≤2.00.

5. The camera optical lens as described in claim 1, wherein following relational expression is satisfied: −1.20≤Sin(A0.8out8)*R8/f4≤0.10.

6. The camera optical lens as described in claim 1, wherein an on-axis thickness of the sixth lens is d11, and following relational expression is satisfied: 9.00≤f6/d11≤16.00.

7. The camera optical lens as described in claim 6, wherein following relational expression is satisfied: 11.00≤f6/d11≤14.00.

8. The camera optical lens as described in claim 1, wherein the first lens is made of glass.

9. A camera optical lens, sequentially comprising seven lenses from an object side to an image side: a first lens having positive refractive power, a second lens having negative refractive power, a third lens having negative refractive power, a fourth lens having positive refractive power, a fifth lens having negative refractive power, a sixth lens having positive refractive power, and a seventh lens having negative refractive power;

wherein an object side surface of the first lens is convex in a paraxial region, and an image side surface of the first lens is concave in a paraxial region; an object side surface of the second lens is convex in a paraxial region, and an image side surface of the second lens is concave in a paraxial region; an object side surface of the third lens is concave in a paraxial region, and an image side surface of the third lens is concave in a paraxial region; an object side surface of the fourth lens is convex in a paraxial region, and an image side surface of the fourth lens is convex in a paraxial region; an object side surface of the fifth lens is convex in a paraxial region, and an image side surface of the fifth lens is concave in a paraxial region; an object side surface of the sixth lens is convex in a paraxial region, and an image side surface of the sixth lens is convex in a paraxial region; an object side surface of the seventh lens is convex in a paraxial region, and an image side surface of the seventh lens is concave in a paraxial region;

wherein a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, a central curvature radius of the object side surface of the first lens in the paraxial region is R1, a central curvature radius of the image side surface of the second lens in the paraxial region is R4, a central curvature radius of the object side surface of the third lens in the paraxial region is R5, a central curvature radius of the image side surface of the fourth lens in the paraxial region is R8, a central curvature radius of the image side surface of the seventh lens in the paraxial region is R14, an angle between a chief ray of the 1.0 field of view of the camera optical lens and an optical axis when it is emitted from the image side of the seventh lens is Sin(A1.0out14), an angle between a chief ray of the 0.8 field of view of the camera optical lens and the optical axis when it is emitted from the image side of the fourth lens is Sin(A0.8out8), a maximum incident angle of all the chief rays of the camera optical lens on the image plane is CRAmax, and following relational expressions are satisfied:

$$-0.300 \le Sin(A1.0out14)*R14/f7 \le 0.003;$$

$$1.05 \le (f1 + f2 + f3 + f4)/(f5 + f6 + f7) \le 2.30;$$

$$-1.40 \le Sin(A0.8out8)*R8/f4 \le 0.10;$$

$$1.60 \le f1/R1 + f4/R8 \le 3.00;$$

$$-14.00 \le f2/R4 + f3/R5 \le -5.50; \text{ and}$$

$$35.00° \le CRAmax \le 40.00°.$$

10. The camera optical lens as described in claim 9, wherein following relational expression is satisfied: 1.95≤f1/R1+f4/R8≤2.55.

11. The camera optical lens as described in claim 9, wherein following relational expression is satisfied: −12.00≤f2/R4+f3/R5≤−7.00.

12. The camera optical lens as described in claim 9, wherein following relational expression is satisfied: −0.230≤Sin(A1.0out14)*R14/f7≤0.003.

13. The camera optical lens as described in claim 9, wherein following relational expression is satisfied: 1.25≤(f1+f2+f3+f4)/(f5+f6+f7)≤2.00.

14. The camera optical lens as described in claim 9, wherein following relational expression is satisfied: −1.20≤Sin(A0.8out8)*R8/f4≤0.10.

15. The camera optical lens as described in claim 9, wherein an on-axis thickness of the seventh lens is d13, and following relational expression is satisfied: −15.00≤f7/d13≤−8.50.

16. The camera optical lens as described in claim 15, wherein following relational expression is satisfied: −12.00≤f7/d13≤−10.00.

17. The camera optical lens as described in claim 9, wherein following relational expression is satisfied: −4.80≤f7/R14≤−1.60.

18. The camera optical lens as described in claim 17, wherein following relational expression is satisfied: −4.00≤f7/R14≤−2.00.

19. The camera optical lens as described in claim 9, wherein the first lens is made of glass.

* * * * *